(12) United States Patent
Liensberger et al.

(10) Patent No.: US 10,203,997 B2
(45) Date of Patent: Feb. 12, 2019

(54) PRESENTING A SYNTHESIZED ALERT USING A DIGITAL PERSONAL ASSISTANT

(71) Applicant: Microsoft Technology Licensing, LLC, Redmond, WA (US)

(72) Inventors: Christian Liensberger, Bellevue, WA (US); Patrick Baumgartner, Kirkland, WA (US); Varsha Mahadevan, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/154,967

(22) Filed: May 14, 2016

(65) Prior Publication Data
US 2017/0329654 A1 Nov. 16, 2017

(51) Int. Cl.
G06F 9/54 (2006.01)
G06Q 10/10 (2012.01)
G06N 99/00 (2010.01)
G06Q 10/06 (2012.01)

(52) U.S. Cl.
CPC ........... G06F 9/542 (2013.01); G06N 99/005 (2013.01); G06Q 10/06 (2013.01); G06Q 10/10 (2013.01)

(58) Field of Classification Search
None
See application file for complete search history.

(56) References Cited

U.S. PATENT DOCUMENTS

| 7,151,438 | B1 | 12/2006 | Hall et al. |
| 7,171,689 | B2 | 1/2007 | Beavers |
| 7,890,962 | B2 | 2/2011 | Vogler-Ivashchanka et al. |
| 8,890,676 | B1* | 11/2014 | Heath ................. G08B 29/188 340/3.1 |
| 2003/0079160 | A1 | 4/2003 | McGee et al. |
| 2006/0244585 | A1* | 11/2006 | Bishop ............... H04L 41/0631 340/506 |
| 2013/0132108 | A1 | 5/2013 | Solilov et al. |
| 2014/0100901 | A1 | 4/2014 | Haine et al. |
| 2014/0118272 | A1* | 5/2014 | Gunn .................... G06F 3/0488 345/173 |

(Continued)

FOREIGN PATENT DOCUMENTS

| EP | 2574023 A1 | 3/2013 |
| WO | 2008051522 A2 | 5/2008 |

OTHER PUBLICATIONS

Tsihrintzis, et al., "Multimedia Services in Intelligent Environments: Integrated Systems", in Publications of Springer, Jul. 12, 2010, 2 pages.

(Continued)

*Primary Examiner* — Syed A Roni
(74) *Attorney, Agent, or Firm* — Wade IP Law LLC

(57) ABSTRACT

Techniques are described herein that are capable of presenting a synthesized alert using a digital personal assistant. A synthesized alert is an alert that is synthesized from multiple subsets of information. Examples of a subset of information include but are not limited to at least one notification (e.g., enterprise alert), at least one calendar entry, at least one document (e.g., word processing document, spreadsheet, Web page, image, audio file, video file, etc.), raw data, processed data, at least one output of an executable, and any combination thereof.

20 Claims, 8 Drawing Sheets

(56) References Cited

U.S. PATENT DOCUMENTS

| | | | |
|---|---|---|---|
| 2014/0195252 A1* | 7/2014 | Gruber | G10L 15/22 |
| | | | 704/275 |
| 2014/0195258 A1 | 7/2014 | Burton et al. | |
| 2014/0297344 A1 | 10/2014 | Beigel | |
| 2015/0199229 A1* | 7/2015 | Amendjian | G06F 11/0769 |
| | | | 714/57 |
| 2015/0358414 A1 | 12/2015 | Mehta et al. | |
| 2016/0170991 A1* | 6/2016 | Birchall | G06F 17/3053 |
| | | | 707/751 |

OTHER PUBLICATIONS

"Enterprise Manager Cloud Control Administrator's Guide", Published on: Jan. 11, 2013, 18 pages, Available at: https://docs.oracle.com/cd/E24628_01/doc.121/e24473/monitor_overview.htm#EMADM11622.

International Search Report and Written Opinion Issued in PCT Application No. PCT/US2017/031470, dated Jul. 25, 2017, 12 Pages.

* cited by examiner

PRESENTING A SYNTHESIZED ALERT USING A DIGITAL PERSONAL ASSISTANT

BACKGROUND

It has become relatively common for devices, such as laptop computers, tablet computers, personal digital assistants (PDAs), and cell phones, to have digital personal assistant functionality. A digital personal assistant is a representation of an entity that interacts with a user of a device. For instance, the digital personal assistant may answer questions that are asked by the user or perform tasks based on instructions from the user. One example of a digital personal assistant is Siri®, which was initially developed by Siri, Inc. and has since been further developed and maintained by Apple Inc. Another example of a digital personal assistant is Cortana®, which is developed and maintained by Microsoft Corporation. A digital personal assistant typically notifies a user of an event each time the event occurs. Thus, if an event occurs relatively frequently, the number of notifications can be quite substantial, and reviewing the notifications may consume a substantial amount of time and resources.

SUMMARY

Various approaches are described herein for, among other things, presenting a synthesized alert using a digital personal assistant. A synthesized alert is an alert that is synthesized from multiple subsets of information. Examples of a subset of information include but are not limited to at least one notification (e.g., enterprise alert), at least one calendar entry, at least one document (e.g., word processing document, spreadsheet, Web page, image, audio file, video file, etc.), raw data, processed data, at least one output of an executable, and any combination thereof.

In a first example approach, information regarding user(s) is analyzed to determine association(s) of the user(s). A relationship between alerts is determined. The alerts are synthesized to provide a synthesized alert based on at least the relationship. A digital personal assistant is caused to present the synthesized alert to a designated user based on at least the association(s).

In a second example approach, enterprise alerts are filtered to determine a same issue with which the enterprise alerts relate. The enterprise alerts are synthesized to provide a synthesized alert. A digital personal assistant is caused to present the synthesized alert regarding the same issue to a user.

In a third example approach, a relationship between subsets of first information is inferred based on at least an analysis of the first information. Second information regarding the subsets is synthesized to provide a synthesized alert based on at least the subsets having the relationship. A digital personal assistant is caused to present the synthesized alert to a user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 3:
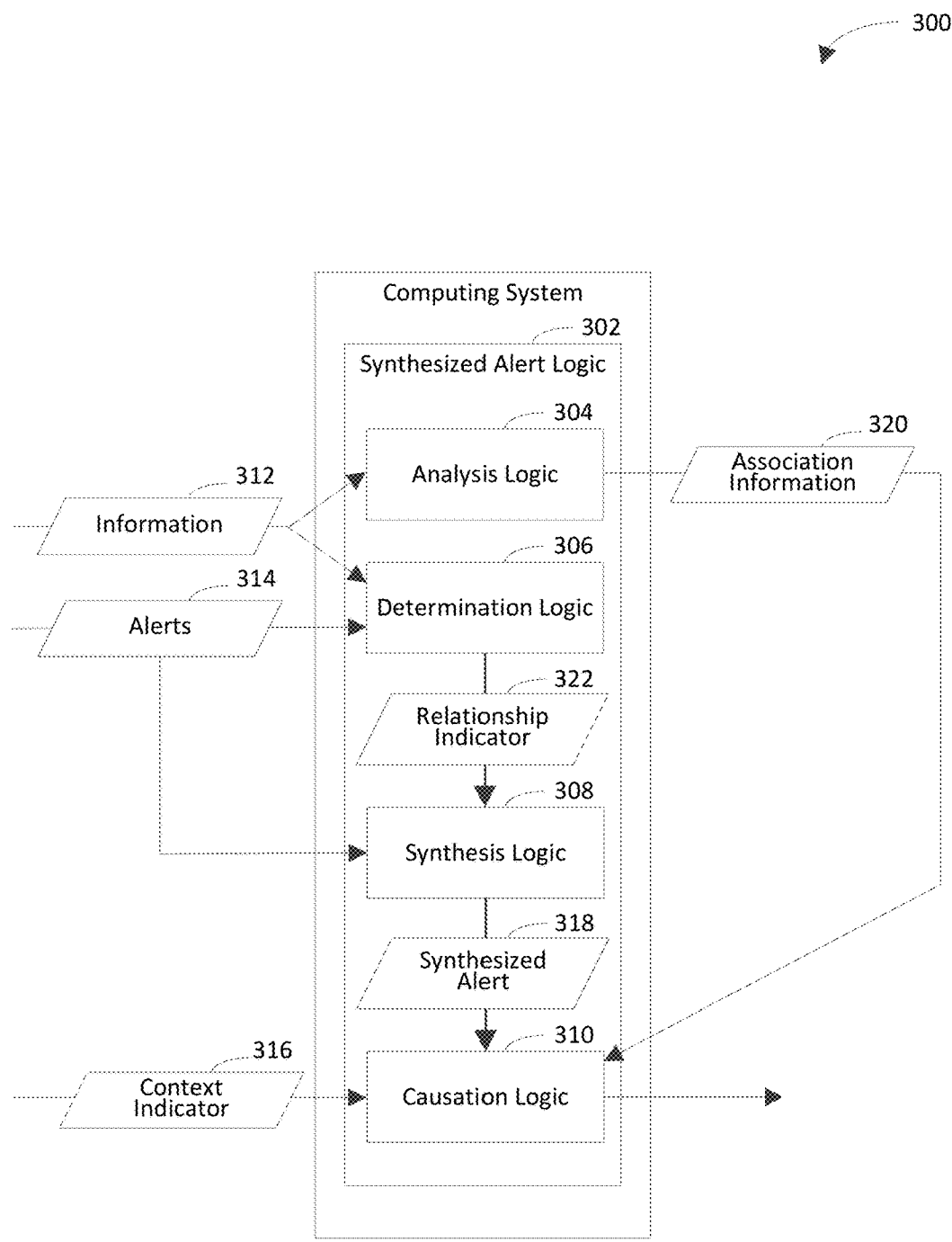
Figure 5:
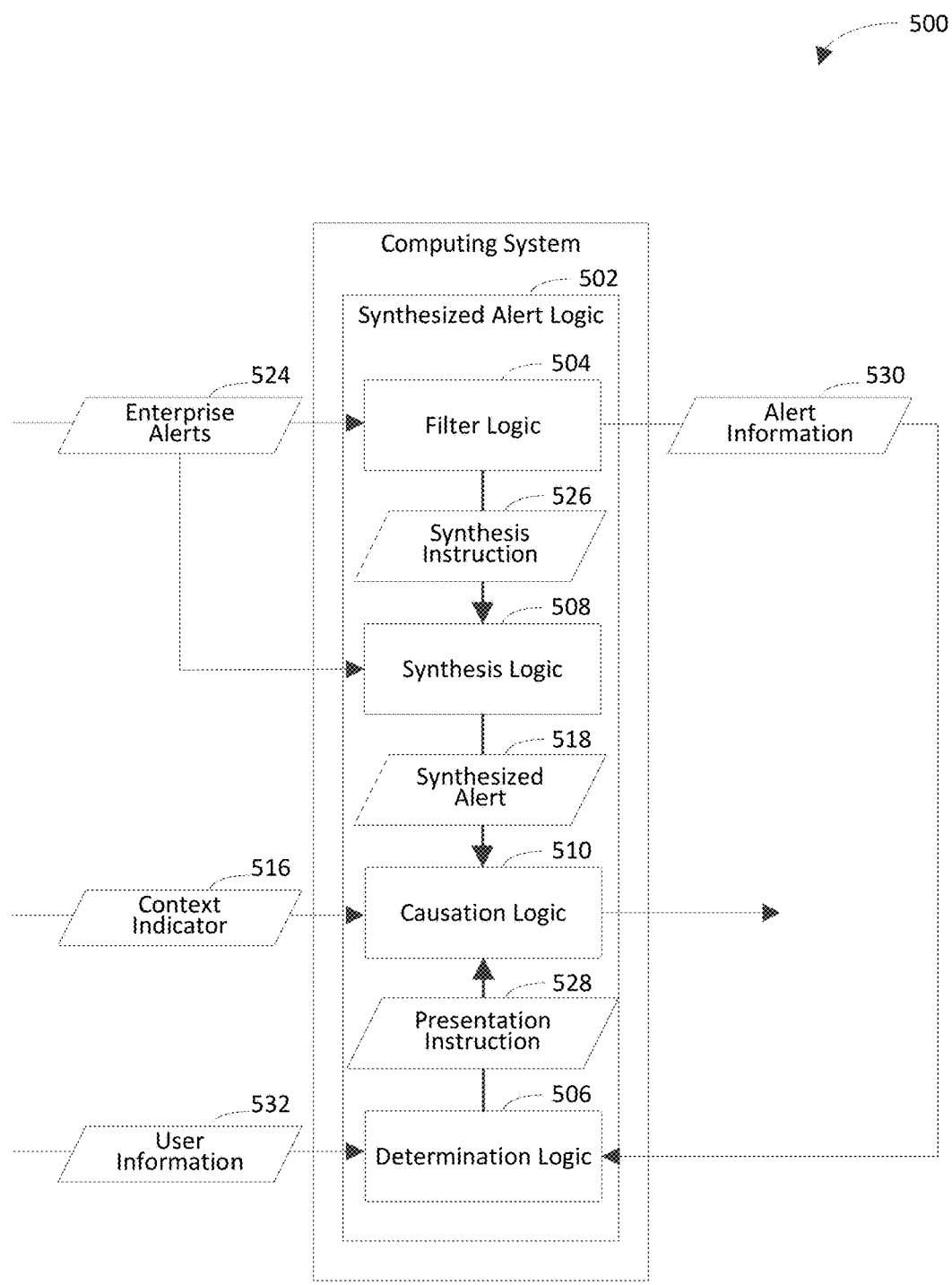
Figure 7:
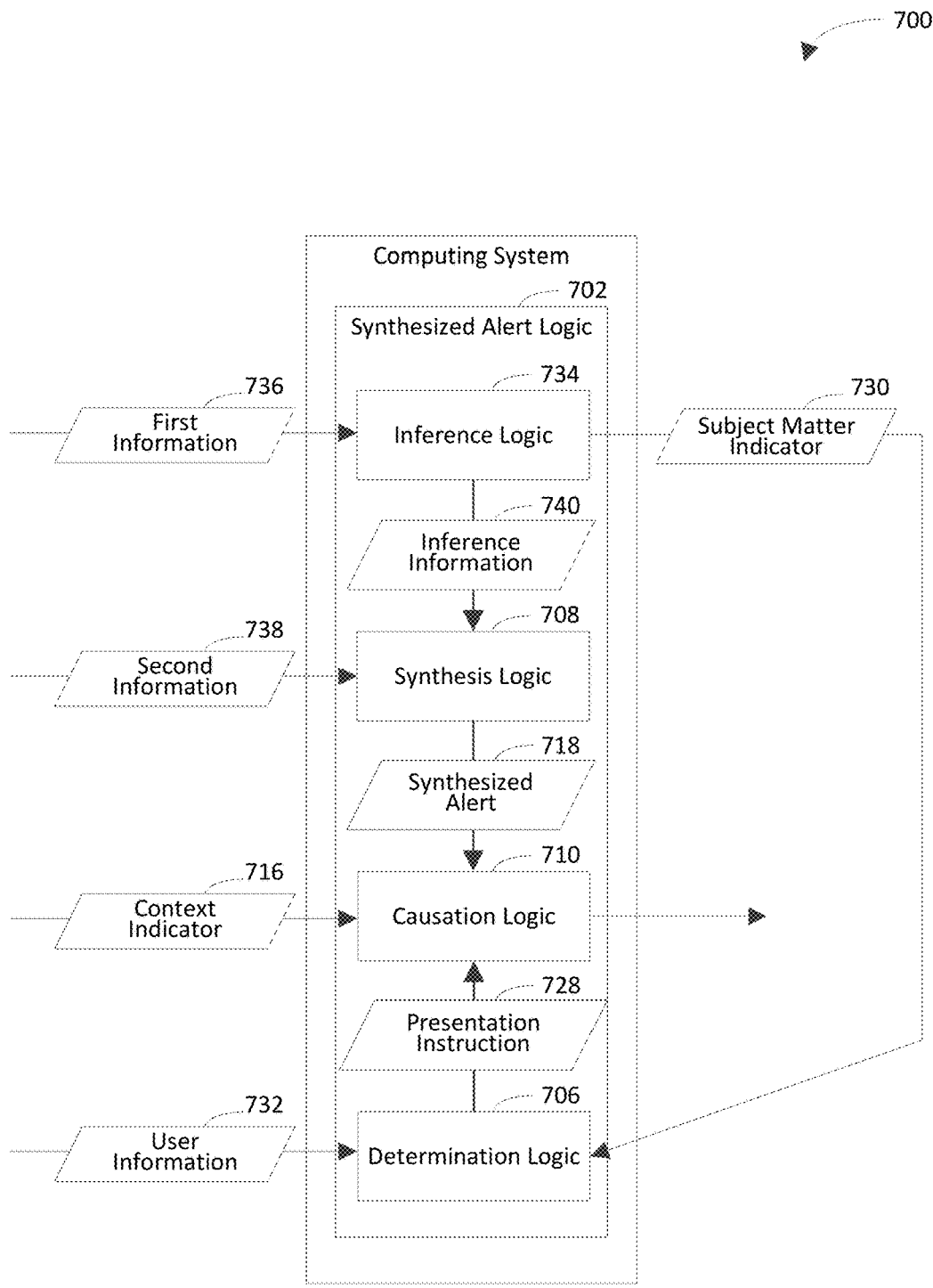

FIGS. 3, 5, and 7 are block diagrams of example computing systems in accordance with embodiments.

Figure 6:
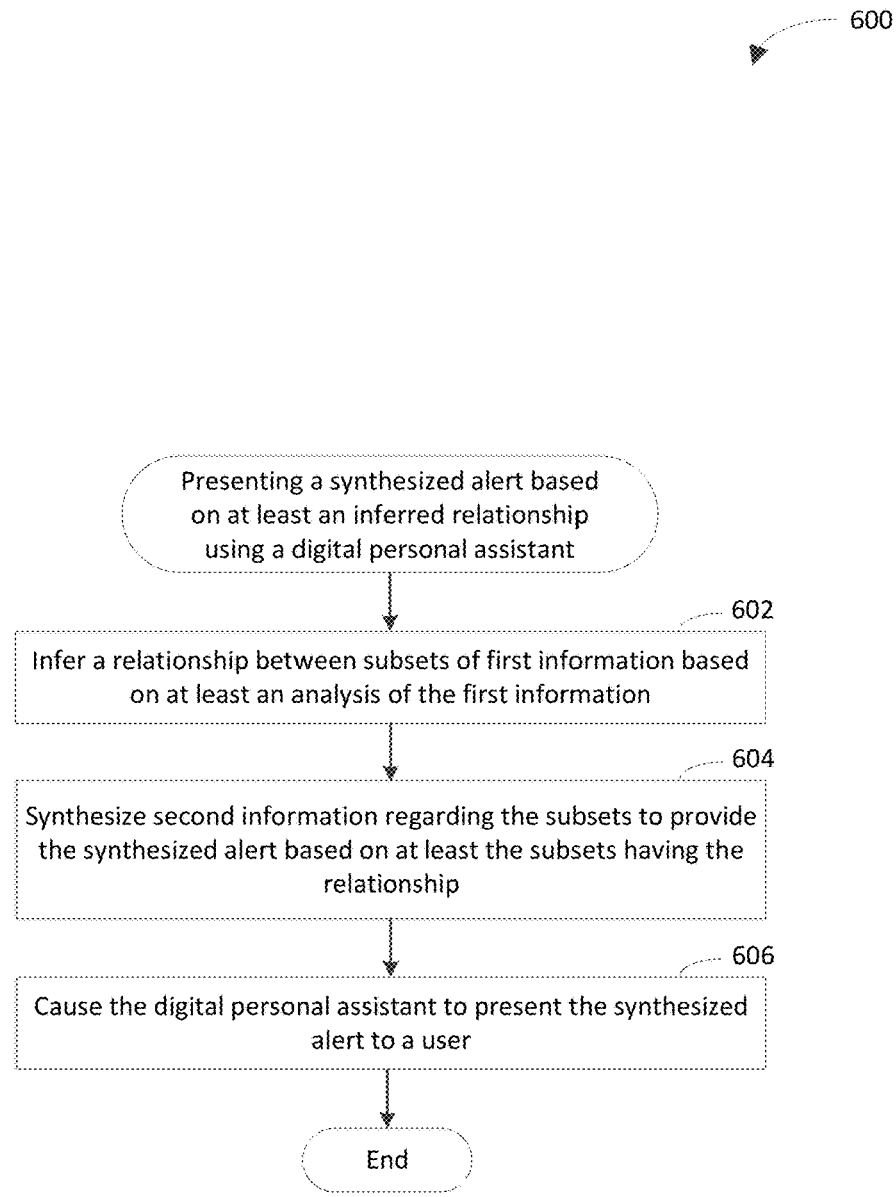

FIG. 6 depicts a flowchart of an example method for presenting a synthesized alert based on at least an inferred relationship using a digital personal assistant in accordance with an embodiment.

Figure 8:
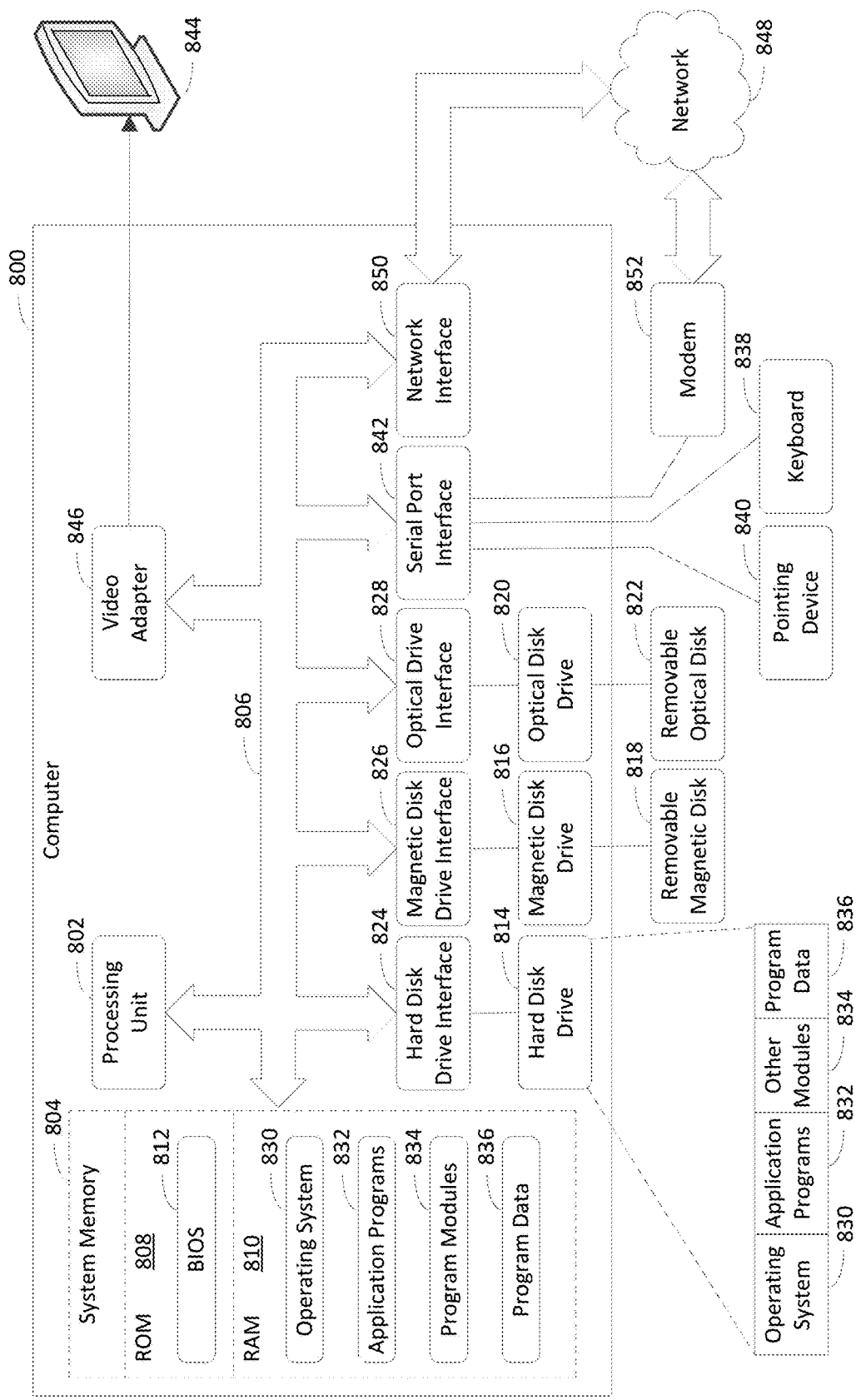

FIG. 8 depicts an example computer in which embodiments may be implemented.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of presenting a synthesized alert using a digital personal assistant. A synthesized alert is an alert that is synthesized from multiple subsets of information. Examples of a subset of information include but are not limited to at least one notification (e.g., enterprise alert), at least one calendar entry, at least one document (e.g., word processing document, spreadsheet, Web page, image, audio file, video file, etc.), raw data, processed data, at least one output of an executable, and any combination thereof.

Example techniques described herein have a variety of benefits as compared to conventional techniques for presenting alerts using a digital personal assistant. For instance, the example techniques may be capable of reducing an amount of information (e.g., a number of alerts) that is presented to a user (e.g., while keeping the user informed of subject matter that is referenced (e.g., included) in the information). The example techniques may be capable of summarizing information from multiple alerts into a common alert (e.g., one alert). The example techniques may enable alerting on top of arbitrary enterprise data, enterprise workflows, and/or predictive content that is generated by systems in an enterprise. The example techniques may be capable of taking into consideration any of a variety of factors, including but not limited to time, location, people, calendar, usual habits, when an application is opened, when a communication is reviewed, and when a meeting is approaching, to determine when a digital personal assistant is to surface a synthesized alert to one or more users.

The example techniques may simplify a process for presenting information to a user using a digital personal assistant. The example techniques may reduce a number of alerts that are provided to a user to convey information that is referenced (e.g., included) in the alerts to the user. The example techniques may increase user efficiency (e.g., by reducing a number of alerts for a user to review to obtain information that is referenced in the alerts). The example techniques are capable of synthesizing subsets of information to provide a synthesized alert. For example, the example techniques may synthesize alerts and/or information regarding the alerts into a synthesized alert. In accordance with this example, the synthesized alert may convey the information that the alerts are configured to provide. In further accordance with this example, the example techniques may reduce (e.g., eliminate) a need for a user to review each of the alerts to determine relevant (e.g., temporally relevant) information associated with the alerts. The example techniques may reduce an amount of time and/or resources (e.g., processor, memory, network bandwidth) that are consumed to convey information using a digital personal assistant. The example embodiments may increase efficiency of a computing device that is used to present the information using the digital personal assistant.

Figure 1:
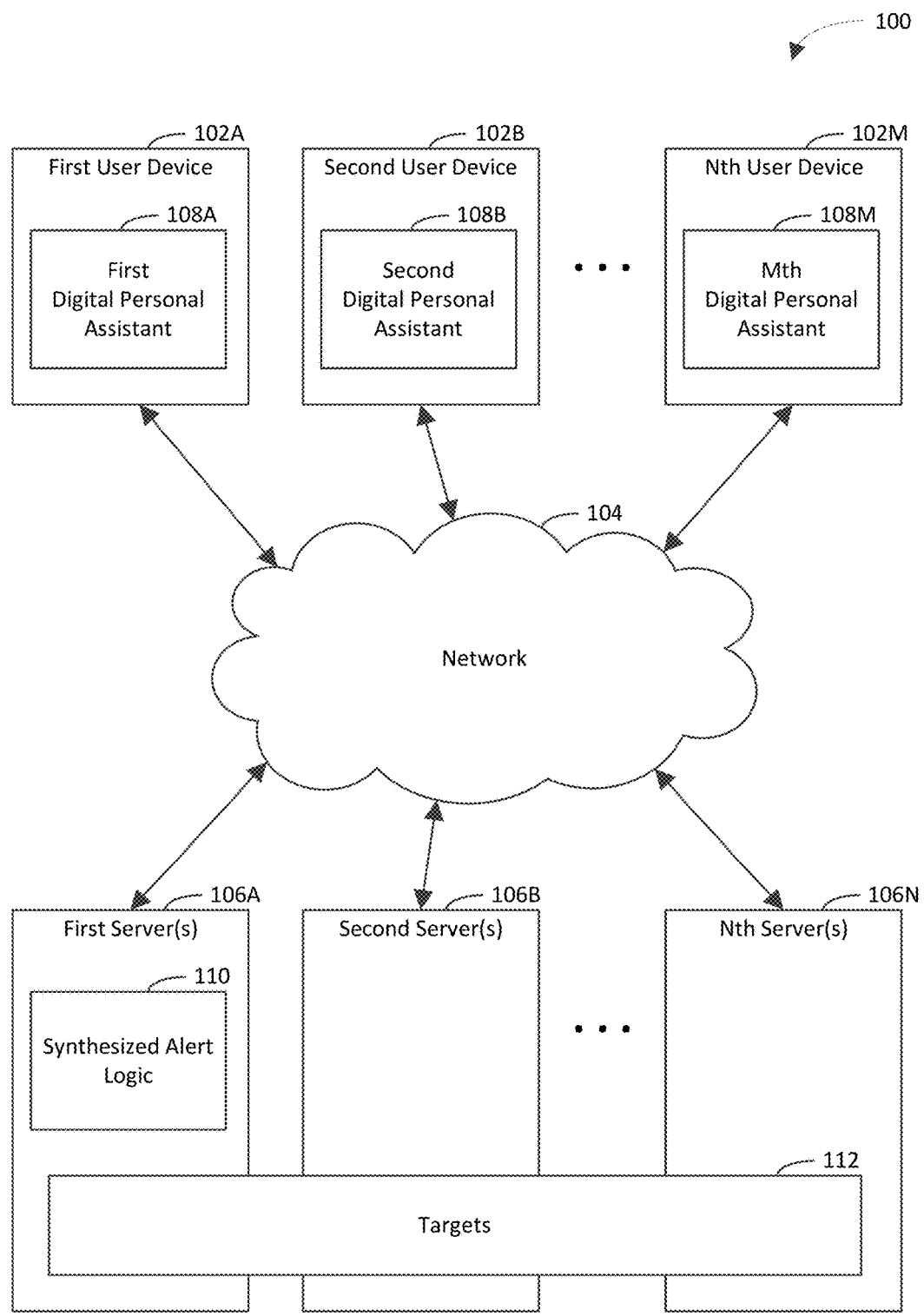
FIG. 1 is a block diagram of an example synthesized alert system in accordance with an embodiment.

FIG. 1 is a block diagram of an example synthesized alert system 100 in accordance with an embodiment. Generally speaking, synthesized alert system 100 operates to provide information to users in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, synthesized alert system 100 presents a synthesized alert using a digital personal assistant. Detail regarding techniques for presenting a synthesized alert using a digital personal assistant. is provided in the following discussion.

As shown in FIG. 1, synthesized alert system 100 includes a plurality of user devices 102A-102M, a network 104, and a plurality of servers 106A-106N. Communication among user devices 102A-102M and servers 106A-106N is carried out over network 104 using well-known network communication protocols. Network 104 may be a wide-area network (e.g., the Internet), a local area network (LAN), another type of network, or a combination thereof.

User devices 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. User devices 102A-102M are configured to provide requests to servers 106A-106N for requesting information stored on (or otherwise accessible via) servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, user devices 102A-102M are capable of accessing domains (e.g., Web sites) hosted by servers 106A-106N, so that user devices 102A-102M may access information that is available via the domains. Such domain may include Web pages, which may be provided as hypertext markup language (HTML) documents and objects (e.g., files) that are linked therein, for example.

Each of user devices 102A-102M may include any client-enabled system or device, including but not limited to a desktop computer, a laptop computer, a tablet computer, a wearable computer such as a smart watch or a head-mounted computer, a personal digital assistant, a cellular telephone, or the like. It will be recognized that any one or more user systems 102A-102M may communicate with any one or more servers 106A-106N.

User devices 102A-102M are shown to include respective digital personal assistants 108A-108M. Digital personal assistants 108A-108M are representations of respective entities that interact with users of user devices 102A-102M. Each of the digital personal assistants 108A-108M may be configured to present a synthesized alert in response to satisfaction of one or more criteria. For instance, first digital personal assistant 108A may be configured to present a first synthesized alert for first user(s) of first user device 102A in response to satisfaction of one or more first criteria. Second digital personal assistant 108B may be configured to present a second synthesized alert for second user(s) of second user device 102B in response to satisfaction of one or more second criteria, and so on. Examples of a criterion that may be satisfied for presentation of a synthesized alert include but are not limited to existence of a relationship between subsets of information (e.g., alerts) from which the synthesized alert is derived, existence of a relationship between users, existence of an interaction between user(s), and existence of an interaction between user(s) and computing device(s).

Servers 106A-106N are processing systems that are capable of communicating with user devices 102A-102M. Servers 106A-106N are configured to execute computer programs that provide information to users in response to receiving requests from the users. For example, the information may include documents (e.g., Web pages, images, audio files, video files, etc.), output of executables, or any other suitable type of information. In accordance with some example embodiments, servers 106A-106N are configured to host respective Web sites, so that the Web sites are accessible to users of relevance-based content system 100.

First server(s) 106A is shown to include synthesized alert logic 110 for illustrative purposes. Synthesized alert logic 110 is configured to implement digital personal assistants 108A-108M. For example, synthesized alert logic 110 may implement any one or more of digital personal assistants 108A-108M to present synthesized alerts.

Some example functionality of synthesized alert logic 110 will now be described with reference to first digital personal assistant 108A for purposes of illustration and is not intended to be limiting. It will be recognized that the functionality of synthesized alert logic 110 described herein is applicable to any suitable digital personal assistant (e.g., any one or more of digital personal assistants 108A-108M).

In a first example, synthesized alert logic 110 analyzes information regarding user(s) (e.g., user(s) of any one or more of user device 102A-102M) to determine association(s) of the user(s). Synthesized alert logic 110 determines a relationship between alerts. Synthesized alert logic 110 synthesizes the alerts to provide a synthesized alert based on at least the relationship. Synthesized alert logic 110 causes first digital personal assistant 108A to present the synthesized alert to a designated user (e.g., a user of first user device 102A) based on at least the association(s).

In a second example, synthesized alert logic 110 filters enterprise alerts to determine a same issue with which the enterprise alerts relate. Synthesized alert logic 110 synthesizes enterprise alerts to provide a synthesized alert. Synthesized alert logic 110 causes first digital personal assistant 108A to present the synthesized alert regarding the same issue to a user (e.g., a user of first user device 102A).

In a third example, synthesized alert logic 110 infers a relationship between subsets of first information based on at least an analysis of the first information. Synthesized alert logic 110 synthesizes second information regarding the subsets to provide a synthesized alert based on at least the subsets having the relationship. Synthesized alert logic 110 causes first digital personal assistant 108A to present the synthesized alert to a user (e.g., a user of first user device 102A).

Synthesized alert logic 110 may be configured to synthesize information that is received from any one or more targets 112 to provide synthesized alert(s). Examples of a target include but are not limited to an application (e.g., a software application), a service, a bot, and a website. Examples of a service include but are not limited to Bing® which is developed and maintained by Microsoft Corporation, Google® which is developed and maintained by Google Inc., and Yahoo!® which is developed and maintained by Yahoo! Inc. A bot may be referred to as a software robot, a Web crawler, or a Web spider.

Each account of a digital personal assistant may be connected to one or more of the targets 112. A target may be connected to an account of a digital personal assistant manually by the user or automatically by the digital personal assistant. For instance, the digital personal assistant may use information regarding the user (e.g., preferences and/or historical activities of the user) to determine that a target is to be connected to an account associated with the user. Each of the targets 112 may provide a respective portion or all of the information that is received by synthesized alert logic 110. Synthesized alert logic 110 may synthesize some or all of the information provided by the targets 112 that are connected to the account(s) of the digital personal assistant to provide the synthesized alerts.

Targets 112 are shown to be distributed across servers 106A-106N for illustrative purposes and are not intended to be limiting. It will be recognized that targets 112 may be included among any one or more of servers 106A-106N.

Any of the digital personal assistants described herein may be a context-aware digital personal assistant, though the scope of the example embodiments is not limited in this respect. A context-aware digital personal assistant is a digital personal assistant that is capable of being aware of context (e.g., context of a user). For instance, the context-aware digital personal assistant may determine the context based on any one or more suitable factors. Examples of such a factor include but are not limited to a location, voice signals, an interaction pattern, a scheduled event, a communication (e.g., email, text message, short message service (SMS) message, and/or social update), network information, a device on which the digital personal assistant is used, an application and/or service that is connected to the device, and one or more people with whom a user interacts.

It should be noted that as synthesized alert logic 110 gathers information about a user over time, the relevancy of the subsets of information that are subsequently selected for providing a synthesized alert may be greater than the relevancy of the subsets of information that were previously selected for providing a synthesized alert. For instance, synthesized alert logic 110 may develop a model of the user or a group to which the user belongs. Synthesized alert logic 110 may develop and/or refine the model using online learning, for example.

Synthesized alert logic 110 may be implemented in various ways to present a synthesized alert using a digital personal assistant, including being implemented in hardware, software, firmware, or any combination thereof. For example, synthesized alert logic 110 may be implemented as computer program code configured to be executed in one or more processors. In another example, synthesized alert logic 110 may be implemented as hardware logic/electrical circuitry. For instance, synthesized alert logic 110 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Synthesized alert logic 110 is shown to be incorporated in first server(s) 106A for illustrative purposes and is not intended to be limiting. It will be recognized that synthesized alert logic 110 (or any portion(s) thereof) may be incorporated in any one or more of the user systems 102A-102M. For example, client-side aspects of synthesized alert logic 110 may be incorporated in one or more of the user systems 102A-102M, and server-side aspects of synthesized alert logic 110 may be incorporated in first server(s) 106A. In another example, synthesized alert logic 110 may be distributed among the user systems 102A-102M. In yet another example, synthesized alert logic 110 may be incorporated in a single one of the user systems 102A-102M. In another example, synthesized alert logic 110 may be distributed among the server(s) 106A-106N. In still another example, synthesized alert logic 110 may be incorporated in a single one of the server(s) 106A-106N.

In some example embodiments, user(s) may interact with a digital personal assistant via synthesized alert logic 110 using voice commands, gesture commands, touch commands, and/or hover commands. For example, any one or more of the user devices 102A-102M may have a microphone that is configured to detect voice commands. In another example, any one or more of the user devices 102A-102M may have a camera that is configured to detect gesture commands. In yet another example, any one or more of the user devices 102A-102M may have a touch screen that is configured to detect touch commands and/or hover commands. A hover command may include a hover gesture. A hover gesture can occur without a user physically touching the touch screen. Instead, the user's hand or portion thereof (e.g., one or more fingers) can be positioned at a spaced distance above the touch screen. The touch screen can detect that the user's hand (or portion thereof) is proximate the touch screen, such as through capacitive sensing. Additionally, hand movement and/or finger movement can be detected while the hand and/or finger(s) are hovering to expand the existing options for gesture input.

Example techniques for presenting a synthesized alert using a digital personal assistant are discussed in greater detail below with reference to FIGS. 2-7.

Figure 2:
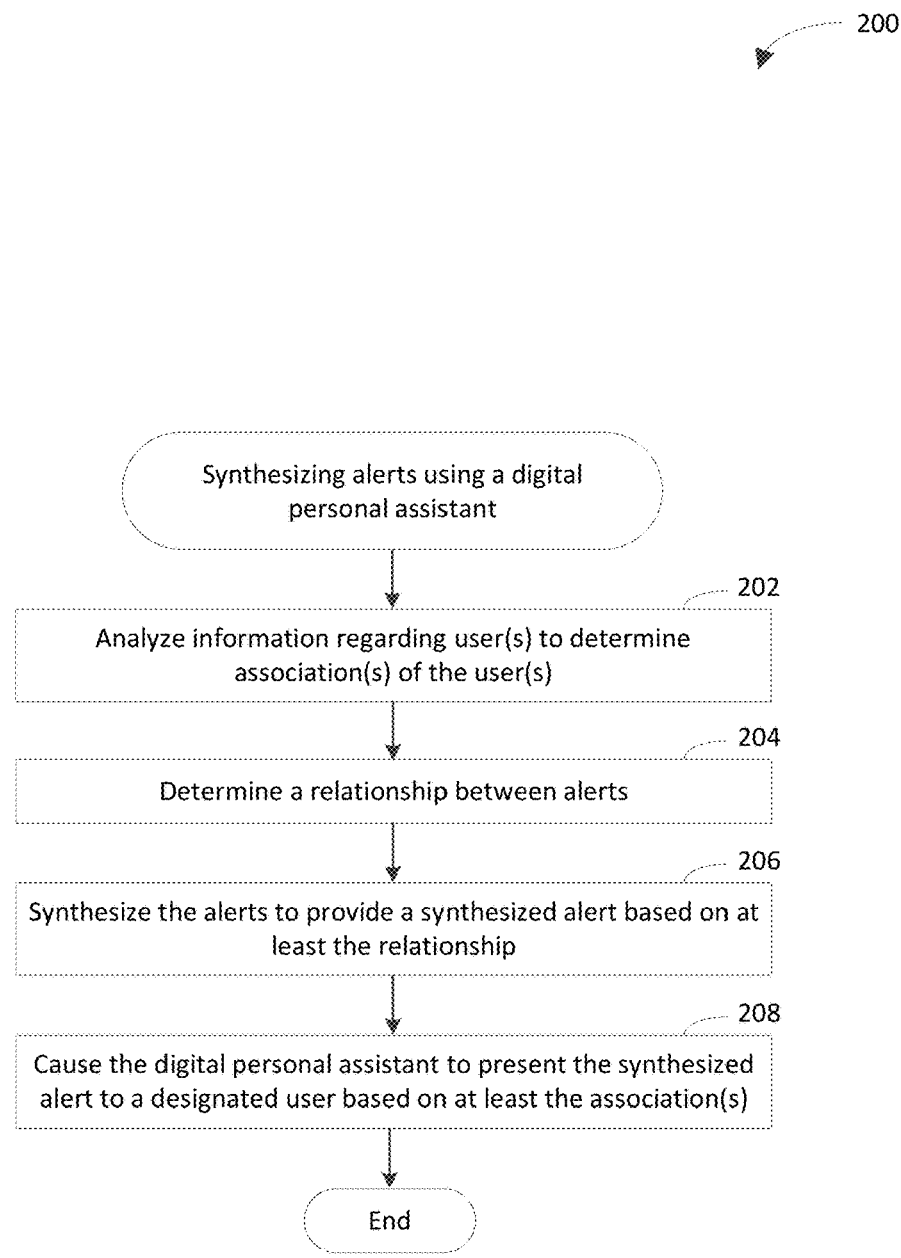
FIGS. 2 and 4 depict flowcharts of example methods for synthesizing enterprise alerts using a digital personal assistant in accordance with embodiments.

FIG. 2 depicts a flowchart 200 of an example method for synthesizing enterprise alerts using a digital personal assistant in accordance with an embodiment. Flowchart 200 may be performed by synthesized alert logic 110 shown in FIG. 1, for example. For illustrative purposes, flowchart 200 is described with respect to computing system 300 shown in FIG. 3. Computing system 300 may include one or more of user systems 102A-102M, one or more of server(s) 106A-106N, or any combination thereof, though the scope of the example embodiments is not limited in this respect. Computing system 300 includes synthesized alert logic 302, which is an example of synthesized alert logic 110 according to an embodiment. As shown in FIG. 3, synthesized alert logic 302 includes analysis logic 304, determination logic 306, synthesis logic 308, and causation logic 310. Further structural and operational embodiments will be apparent to persons skilled in the relevant art(s) based on the discussion regarding flowchart 200.

As shown in FIG. 2, the method of flowchart 200 begins at step 202. In step 202, information regarding user(s) is analyzed to determine association(s) of the user(s). The user(s) may include a designated user to whom the digital personal assistant is to present a synthesized alert, one or more other users, or a combination thereof. In one example, an association of a user may be an association of the user with one or more other users (e.g., who are in a same location, work for a same manager, are in a same group (e.g., project, team), and/or have a same title as the user. In another example, an association of a user may be an association of the user with one or more computing devices. An association may be any suitable type of association, including but not limited to an interaction and a relationship. In another example, the association(s) may be inferred from the information. In yet another example, the information may specify (e.g., explicitly specify) the association(s). In an example implementation, analysis logic 304 analyzes information 312 regarding the user(s) to determine the association(s) of the user(s). In accordance with this implementation, analysis logic 304 may generate association information 320 in response to determining the association(s). For instance, the analysis information 320 may specify the association(s).

At step 204, a relationship between alerts is determined. In one example, the relationship may be based on information that is learned from operation(s) and/or relationship(s) that have occurred in the past. In another example, the relationship may be explicitly defined by a user (e.g., a designated user to whom the synthesized alert is to be presented). In an example implementation, determination logic 306 determines the relationship between alerts 314. In accordance with this implementation, determination logic 306 may generate a relationship indicator 322 in response to determining the relationship. For example, the relationship indicator 322 may indicate that the alerts 314 are related. In accordance with this example, the relationship indicator 322 may specify the relationship between the alerts 314.

Any one or more of the alerts may be an enterprise alert. An enterprise alert is an alert that is generated by a system (e.g., an enterprise target) in an enterprise. For instance, an enterprise alert may include a notification of a problem that has occurred with a system in the enterprise, a warning regarding a potential problem with a system in the enterprise, a notification regarding a scheduled event that is to occur in the enterprise, inferred information regarding a system (e.g., regarding operation(s) that are performed by the system) in the enterprise, and so on. An enterprise alert may be an alert regarding work-related task(s), event(s), and/or operation(s). For example, an enterprise may pertain to work of a user. In accordance with this example, an enterprise may be provided by a company for which a user works. In accordance with this example, the enterprise may generate information (e.g., alerts) that pertain to work (e.g., meetings, projects, teams, tasks) of the user.

Any one or more of the alerts may be a personal alert. A personal alert is an alert that is not generated by an enterprise. For example, a personal alert may pertain to a personal life of a user. Accordingly, the personal alert may not pertain to work of the user. In accordance with this example, the personal alert may relate to a social event or activity, member(s) of the user's family, friend(s) of the user, interest(s) of the user, and so on.

In an example embodiment, the relationship between the alerts is inferred. In accordance with this embodiment, the relationship may be inferred based on any of a variety of factors, including but not limited to a time associated with the alerts (e.g., the alerts being triggered within a designated period of time, the alerts pertaining to event(s) that occur and/or that are scheduled to occur at a designated time or within a designated period of time); a location associated with the alerts (e.g., the alerts pertaining to an issue that arises at the location, the alerts pertaining to an issue that affects person(s) and/or computing device(s) at the location, the alerts pertaining to an event that occurs at the location and/or that is scheduled to occur at the location); the alerts relating to a same issue and/or a same system (e.g., in an enterprise); the alerts relating to issue(s) that affect the same person(s); and the alerts relating to events that historically occur together (e.g., within a designated period of time).

In another example embodiment, the relationship is determined at step 204 between multiple subsets of the alerts that are received from respective systems (e.g., of an enterprise). Each subset includes at least one of the alerts. One or more (e.g., all) of the subsets may include multiple alerts. In an aspect of this embodiment, the alerts include enterprise alerts. In an example of this aspect, the relationship may be determined at step 204 between multiple subsets of the enterprise alerts that are received from respective systems in an enterprise. For instance, the systems may be in respective silos between which communication does not occur. In another example of this aspect, the enterprise alerts may be received from a single system in the enterprise.

At step 206, the alerts are synthesized to provide a synthesized alert (e.g., a single synthesized alert) based on at least the relationship. For instance, the synthesized alert may summarize (e.g., explain) an issue with which the alerts are associated. In one example, the alerts may be transformed into the synthesized alert. In another example, the alerts may be from a discrete state to a synthesized state. In accordance with this example, the discrete state is characterized by each alert being represented separately from other alerts. In further accordance with this example, the synthesized state is characterized by information regarding the alerts (e.g., the alerts themselves) being synthesized into the synthesized alert.

The synthesized alert may be tailored to a designated user to whom the synthesized alert is to be presented, though the scope of the example embodiments is not limited in this respect. For instance, synthesized alerts that are provided for different users based on at least the relationship may be tailored to those respective users. Accordingly, a first synthesized alert may be provided for a first user; a second synthesized alert that is different from the first synthesized alert may be provided for a second user; a third enterprise alert that is different from at least one of the first and second enterprise alerts may be provided for a third user, and so on.

In an example implementation, synthesis logic 308 synthesizes the alerts 314 to provide a synthesized alert 318 based on at least the relationship. For example, synthesis logic 308 may synthesize the alerts 314 in response to receipt of the relationship indicator 322. In accordance with this example, synthesis logic 308 may synthesize the alerts 314 based at least in part on the relationship indicator 322 indicating that the alerts 314 are related and/or based at least in part on the relationship indicator 322 specifying the relationship between the alerts 314.

In an example embodiment, synthesizing the alerts at step 206 is further based on at least the association(s) of the user(s). For example, the alerts that have the relationship may be filtered to exclude those to which the association(s) do not pertain. In accordance with this example, if an association corresponds to members of a team, the alerts may be filtered to exclude those that do not pertain to the team (e.g., to the members of the team).

At step 208, the digital personal assistant is caused to present the synthesized alert to a designated user based on at least the association(s). For example, the digital personal assistant may be caused to present the synthesized alert in lieu of the alerts. In accordance with this example, the synthesized alert may be provided rather than each of the alerts. In an example implementation, causation logic 310 causes the digital personal assistant to present the synthesized alert 318 to the designated user based on at least the association(s). For example, causation logic 310 may cause the digital personal assistant to present the synthesized alert 318 to the designated user in response to receipt of the association information 320. In accordance with this example, causation logic 310 may cause the digital personal assistant to present the synthesized alert 318 to the designated user based at least in part on the association information 320 specifying the association(s).

In one example implementation, assume that information regarding users in an enterprise is analyzed at step 202 to determine that the users are members of an information technology (IT) team of the enterprise. Further assume that a first enterprise alert indicates an increase of a first attribute of a first system in the enterprise, and a second enterprise alert indicates a decrease of a second attribute of a second system in the enterprise. In accordance with this implementation, determining the relationship at step 204 may include determining the relationship between the first enterprise alert and the second enterprise alert. For example, historical data may indicate that an increase of the first attribute of the first system and a decrease of the second attribute of the second system typically results in a designated problem. In accordance with this example, the relationship may be determined based on at least the historical data indicating that an increase of the first attribute of the first system and a decrease of the second attribute of the second system typically results in the designated problem. In further accordance with this implementation; synthesizing the alerts at step 206 may include synthesizing the first and second enterprise alerts to generate the synthesized alert. For instance, the synthesized alert may summarize the designated issue that typically results from an increase of the first attribute of the first system and a decrease of the second attribute of the second system. The synthesized alert may indicate that the designated issue is likely to occur, recommend an action to mitigate the designated issue (e.g., prevent the designated issue from occurring), etc. In further accordance with this implementation, causing the digital personal assistant to present the synthesized alert at step 208 may include causing the digital personal assistant to present the synthesized alert to the members of the IT team.

In an example embodiment, causing the digital personal assistant to present the synthesized alert to the designated user at step 208 is based on at least a context of the designated user. For example, causation logic 310 may cause the digital personal assistant to present the synthesized alert 318 to the designated user in response to receipt of a context indicator 316. The context indicator 316 may specify the context of the designated user and/or include an instruction that instructs causation logic 310 to cause the synthesized alert 318 to be presented to the designated user. In accordance with this example, determination logic 306 may determine the context of the designated user. For instance, determination logic 306 may analyze the information 312 regarding the user(s) to determine the context of the designated user. In further accordance with this example, determination logic 306 may generate the context indicator 316 to specify the context of the designated user and/or to include the aforementioned instruction in response to determining the context of the designated user.

In one aspect of this example, the context indicator 316 specifies the context of the designated user. In accordance with this aspect, causation logic 310 may compare the context of the designated user, as specified by the context indicator 316, to a reference context. Causation logic 310 may cause the digital personal assistant to present the synthesized alert 318 to the designated user in response to the context of the designated user matching the reference context. Causation logic 310 may determine a statistical probability that the context of the designated user corresponds to the reference context. The context of the designated user having a statistical probability greater than or equal to a threshold probability may indicate that the context of the designated user corresponds to (e.g., matches) the reference context. The context of the designated user having a statistical probability less than the threshold probability may indicate that the context of the designated user does not correspond to the reference context.

In another aspect, the context indicator 316 may include an instruction that instructs causation logic 310 to cause the synthesized alert 318 to be presented to the designated user. In accordance with this aspect, determination logic 306 (e.g., rather than causation logic 310) may compare the context of the designated user to the reference context. Determination logic 306 may generate the context indicator 316 to include an instruction that instructs causation logic 310 to cause the synthesized alert 38 to be presented to the designated user in response to the context of the designated user matching the reference context.

The context of a user may be based on any one or more suitable factors. For instance, the context of the user may be derived from (e.g., inferred from) any of such factor(s). Examples of such a factor include but are not limited to a location (e.g., a current or anticipated location of the user, a place with which the user is associated), a time (e.g., a time at which the user performs an operation, encounters a situation, or is at a location), voice signals (e.g., speech or identifying attribute(s) of a voice of the user), an interaction pattern (e.g., of the user with content, device(s), and/or other person(s)), a scheduled event (e.g., a scheduled event of the user and/or a scheduled event of another person that is statistically likely to have an effect on the user), a communication (e.g., a conversation), information regarding a network (e.g., a home network or a work network) that is being used by the user, a device (e.g., a type of the device) on which the digital personal assistant is used, the user being engaged with a device via which the digital personal assistant is provided, an application and/or service that is connected to the device, one or more people in the user's presence, and one or more people with whom the user interacts and/or has a relationship (e.g., one or more family members or co-workers of the user).

The aforementioned communication may be any suitable communication, including but not limited to a communication to the user, a communication from the user, a communication related to a scheduled event of the user, a communication related to a group (e.g., team) that includes the user, a communication regarding one or more opportunities (e.g., career opportunities, dating opportunities) that are available to the user, and a communication related to an organization with which the user is associated. The communication may be a message (e.g., a textual message or a verbal message) or a combination of messages. Examples of a message include but are not limited to an email, a text message, a short message service (SMS) message, and a social update. A determination whether a user is engaged with a device may be made based at least in part on the user turning on the device, or providing a command (e.g., pressing a key, providing a touch, hover, or gesture command, signing-in to the device or an account using the device, moving a cursor of the device) via an interface of the device.

Some other examples of such a factor include but are not limited to the user working late, the user working during lunch, the user being proximate (e.g., within a designated proximity to) an entity (e.g., a business) while in transit to a destination (e.g., home or work), search history of the user, browse history of the user, applications that have been opened by the user or that are currently opened by the user, and habit(s) of the user.

In an example implementation of this embodiment, assume that an information technology (IT) team of an enterprise issues alerts to all employees of the enterprise, indicating that a fire alarm is scheduled to occur at a designated time in a designated building. In accordance with this implementation, the information may be analyzed at step 202 to determine which of the employees work in the building. In further accordance with this implementation, determining the relationship at step 204 may include determining that each of the alerts pertains to the fire alarm.

In one aspect of this implementation, a determination may be made that the designated user is in the building within a designated duration of time prior to a time at which the fire alarm is scheduled to occur. For instance, determination logic 306 may determine that the designated user is in the building within the designated duration of time prior to the time at which the fire alarm is scheduled to occur. In accordance with this aspect, causing the digital personal assistant to present the synthesized alert at step 208 may include causing the digital personal assistant to present the synthesized alert to the designated user based on at least the designated user being an employee who works in the building and further based on the designated user being in the building within the designated duration of time prior to the time at which the fire alarm is scheduled to occur. For instance, the synthesized alert may indicate that the fire alarm is going to occur at the scheduled time.

It should be noted that if the designated user had not been in the building within the designated duration of time prior to the time at which the fire alarm is scheduled to occur, the digital personal assistant may not have been caused to present the synthesized alert to the designated user.

In another aspect of this implementation, a determination may be made that the designated user is on the way to work within the designated duration of time prior to the time at which the fire alarm is scheduled to occur. For instance, determination logic 306 may make the determination. In accordance with this aspect, causing the digital personal assistant to present the synthesized alert at step 208 may include causing the digital personal assistant to present the synthesized alert to the designated user based on at least the designated user being an employee who works in the building and further based on the designated user being on the way to work within the designated duration of time prior to the time at which the fire alarm is scheduled to occur. For instance, the synthesized alert may provide a recommendation, such as, "Why don't you stop and grab a cup of coffee? You aren't going to miss anything at work—the fire alarm is about to start."

In another example embodiment, analyzing the information at step 202 includes analyzing the information regarding the user(s) to determine a relationship between the designated user and one or more second users. In accordance with this embodiment, causing the digital personal assistant to present the synthesized alert at step 208 includes causing the digital personal assistant to present the synthesized alert to the designated user based on at least the relationship between the designated user and the one or more second users. For instance, the one or more second users and the designated user may be co-workers, members of a same family, friends, associated in a same social network of a social networking system, have a same title, be in a same location, and/or work for a same manager. At least one of the one or more second users may have triggered at least one of the alerts, though the scope of the example embodiments is not limited in this respect.

In yet another example embodiment, analyzing the information at step 202 includes analyzing the information regarding the user(s) to determine at least one interaction (e.g., communication, commercial transaction) between the designated user and at least one second user. In accordance with this embodiment, causing the digital personal assistant to present the synthesized alert at step 208 includes causing the digital personal assistant to present the synthesized alert to the designated user based on at least the interaction.

In still another example embodiment, the alerts include enterprise alert(s) and personal alert(s). In accordance with this embodiment, determining the relationship at step 204 includes determining the relationship between the enterprise alert(s) and the personal alert(s). In further accordance with this embodiment, synthesizing the alerts at step 206 includes synthesizing the enterprise alert(s) and the personal alert(s) to provide the synthesized alert.

In another example embodiment, determining the relationship at step 204 includes determining that the alerts are relevant to a scheduled event of the designated user. In accordance with this embodiment, causing the digital personal assistant to present the synthesized alert at step 208 includes causing the digital personal assistant to present the synthesized alert to the designated user further based on at least the scheduled event of the designated user being scheduled to occur within a threshold duration of time from a current time. For instance, the scheduled event may be identified by a calendar entry of the designated user. Examples of a scheduled event include but are not limited to a meeting (e.g., with specified people), a call, and an appointment.

In some example embodiments, one or more steps 202, 204, 206, and/or 208 of flowchart 200 may not be performed. Moreover, steps in addition to or in lieu of steps 202, 204, 206, and/or 208 may be performed. For instance, in an example embodiment, the method of flowchart 200 further includes causing the digital personal assistant to suggest an operation for the designated user to perform to address (e.g., mitigate, resolve) an issue identified by the synthesized alert. In an example implementation, causation logic 310 causes the digital personal assistant to suggest the operation for the designated user to perform to address the issue identified by the synthesized alert 318.

In another example embodiment, the method of flowchart 200 further includes causing the digital personal assistant to perform an operation on behalf of the designated user to address an issue identified by the synthesized alert. For example, the digital personal assistant may be proactively caused to perform the operation on behalf of the designated user (e.g., without first requesting approval from the designated user). In an example implementation, causation logic 310 causes the digital personal assistant to perform the operation on behalf of the designated user to address the issue identified by the synthesized alert 318.

In yet another example embodiment, the method of flowchart 200 further includes determining that the alerts are received at a rate that is greater than a threshold rate. For instance, determination logic 306 may determine that the alerts 314 are received at the rate that is greater than the threshold rate. In accordance with this embodiment, causing the digital personal assistant to present the synthesized alert at step 208 includes causing the digital personal assistant to present the synthesized alert to the designated user in response to determining that the alerts are received at the rate that is greater than the threshold rate.

In an aspect of this embodiment, determining the relationship between the alerts at step 204 includes determining that each of the alerts indicates that a designated threshold is exceeded. In accordance with this aspect, synthesizing the alerts at step 206 includes synthesizing the alerts to provide the synthesized alert, which indicates that the designated threshold is repetitively exceeded. For example, the alerts may include a specified number of alerts corresponding to a respective number of instances in which the designated threshold is exceeded. In accordance with this example, the synthesized alert may indicate that the designated threshold is exceeded the specified number of times.

In an example implementation of this aspect, assume that the designated user or another user sets a throughput threshold at 90% and indicates that an alert is to be sent to members of the IT team when throughput of a system (e.g., machine) exceeds the throughput threshold. Further assume that the throughput of the system changes from 89% to 91% to 89% to 91%, and so on. Each time the throughput exceeds 90%, another alert is generated. For instance, the throughput threshold may be exceeded 50 times within a relatively short duration of time. Synthesis logic 308 may synthesize the various alerts to provide the synthesized alert, stating, "The throughput of the system went above and below the threshold 50 times. Do you want me to set the threshold a little bit lower or a little bit higher?" In accordance with this implementation, causation logic 310 may cause the synthesized alert to be presented to the designated user in response to a determination that the designated user is a member of the IT team.

In still another example embodiment, the method of flowchart 200 further includes determining that a specified user is not available to perform an operation to address an issue that is associated with the alerts. For example, performing the operation may be a responsibility of the specified user (e.g., within a job description of the specified user). In accordance with this example, the specified user may be on vacation or in a location where the specified user does not have access to a communication service, such as email or telephone. In an example implementation, determination logic 306 determines that the specified user is not available. For instance, determination logic 306 may analyze the information 312 regarding the user(s) to determine that the specified user is not available.

In accordance with this embodiment, causing the digital personal assistant to present the synthesized alert at step 208 includes causing the digital personal assistant to present the synthesized alert to the designated user further based on at least the specified user not being available to perform the operation to address the issue that is associated with the alerts. For example, the designated user may serve as a back-up when the specified user is unavailable. In accordance with this example, the specified user may be a manager of the designated user. In an example implementation, determination logic 306 may determine that the designated user is available to perform the operation. For instance, determination logic 306 may analyze the information 312 regarding the user(s) to determine that the designated user is available. In accordance with this implementation, causation logic 310 may cause the digital personal assistant to present the synthesized alert 318 to the designated user further based on at least a determination that the designated user is available.

In yet another example embodiment, the alerts include enterprise alerts. In accordance with this embodiment, the method of flowchart 200 further includes determining that a role of the designated user in an enterprise is to perform an operation to address an issue that is associated with the enterprise alerts. In an example implementation, determination logic 306 determines that the role of the designated user is to perform the operation. For instance, determination logic 306 may analyze the information 312 regarding the user(s) to determine that the role of the designated user is to perform the operation.

For example, determining that the role of the designated user is to perform the operation may include inferring the role of the designated user. In accordance with this example, the role of the designated user may be inferred from historical information, such as one or more interactions (e.g., interaction patterns) of the designated user. For instance, the historical information may indicate that the designated user often performs operation(s) to address the issue that is associated with the enterprise alerts and/or issue(s) that are similar to the issue that is associated with the enterprise alerts. In an aspect of this example, analyzing the information at step 202 includes analyzing the information regarding the user(s) to determine interaction(s) of the designated user (e.g., with at least one second user, at least one application, at least one service, and/or at least one device). For instance, the information may indicate that the designated user often looks at finance alerts. In accordance with this aspect, determining the role of the designated user includes determining the role of the user based on at least one of the interaction(s) of the designated user.

In another example, determining that the role of the designated user is to perform the operation may include determining that the role of the designated user is to perform the operation based on at least a manager of the designated user and/or an administrator in the enterprise specifying that the designated user has the role. For instance, managers and/or administrators in the enterprise may assign people to receive alerts. For instance, alerts of a first type may be assigned to first person(s); alerts of a second type may be assigned to second person(s), and so on.

In further accordance with this embodiment, causing the digital personal assistant to present the synthesized alert at step 208 includes causing the digital personal assistant to present the synthesized alert to the designated user further based on at least the designated user having the role of performing the operation to address the issue that is associated with the enterprise alerts.

In an aspect of this embodiment, the method of flowchart 200 further includes determining that a second user in the enterprise does not have the role of performing the operation to address the issue that is associated with the enterprise alerts. For example, determination logic 306 may determine that the second user does not have the role. For instance, historical information may indicate that the second user typically does not perform operation(s) to address the issue that is associated with the enterprise alerts. In accordance with this example, determination logic 306 may analyze the information 312 regarding the user(s) to determine that the second user does not have the role. In accordance with this aspect, the method of flowchart 200 may further include not causing the digital personal assistant to present the synthesized alert to the second user based on at least the second user not having the role of performing the operation to address the issue that is associated with the enterprise alerts. For instance, causation logic 310 may not cause the digital personal assistant to present the synthesized alert 318 to the second user.

It will be recognized that computing system 300 may not include one or more of synthesized alert logic 302, analysis logic 304, determination logic 306, synthesis logic 308, and/or causation logic 310. Furthermore, computing system 300 may include components in addition to or in lieu of synthesized alert logic 302, analysis logic 304, determination logic 306, synthesis logic 308, and/or causation logic 310.

Figure 4:
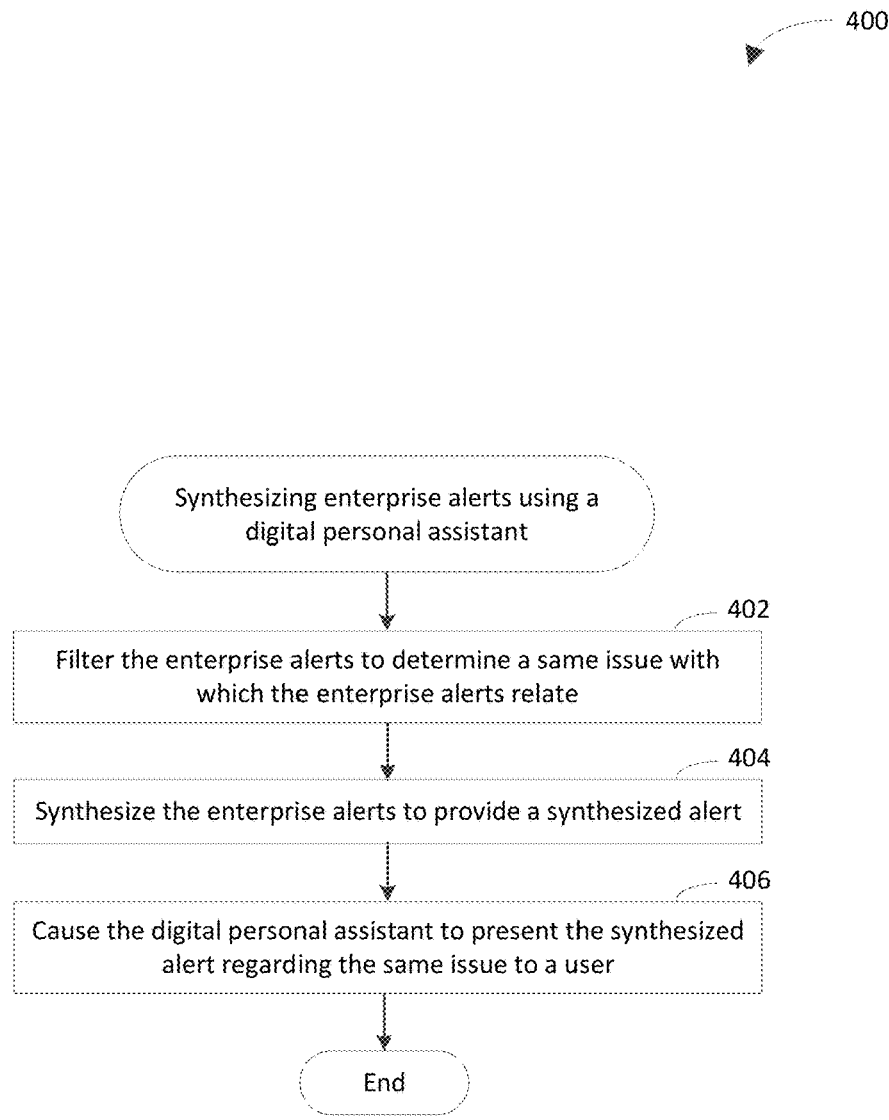

FIG. 4 depicts a flowchart 400 of another example method for synthesizing enterprise alerts using a digital personal assistant in accordance with an embodiment. Flowchart 400 may be performed by synthesized alert logic 110 shown in FIG. 1, for example. For illustrative purposes, flowchart 400 is described with respect to computing system 500 shown in FIG. 5. Computing system 500 may include one or more of user systems 102A-102M, one or more of server(s) 106A-106N, or any combination thereof, though the scope of the example embodiments is not limited in this respect. Computing system 500 includes synthesized alert logic 502, which is an example of synthesized alert logic 110 according to an embodiment. As shown in FIG. 5, synthesized alert logic 502 includes filter logic 504, determination logic 506, synthesis logic 508, and causation logic 510. Further structural and operational embodiments will be apparent to persons skilled in the relevant art(s) based on the discussion regarding flowchart 400.

As shown in FIG. 4, the method of flowchart 400 begins at step 402. In step 402, the enterprise alerts are filtered to determine a same issue with which the enterprise alerts relate. In an example implementation, filter logic 504 filters enterprise alerts 524 to determine a same issue with which the enterprise alerts 524 relate. In accordance with this implementation, filter logic 504 may generate a synthesis instruction 526 in response to (e.g., based on) determining that the enterprise alerts 524 relate to the same issue. The synthesis instruction 526 may instruct synthesis logic 508 to synthesize the enterprise alerts 524.

In an example embodiment, filtering the enterprise alerts at step 402 includes filtering subsets of the enterprise alerts that are received from respective systems in an enterprise to determine the same issue with which the subsets relate. For instance, a first subset of the enterprise alerts may be received from a first system in the enterprise. A second subset of the enterprise alerts may be received from a second system in the enterprise, and so on. Examples of a system in an enterprise include but are not limited to an email system, a calendaring system, a customer relationship management (CRM) system, a human resources system, a marketing system, and any one or more machines in the enterprise.

At step 404, the enterprise alerts are synthesized to provide a synthesized alert. In an example implementation, synthesis logic 508 synthesizes the enterprise alerts 524 to provide a synthesized alert 518. For instance, synthesis logic 508 may synthesize the enterprise alerts 524 in response to receipt of the synthesis instruction 526.

At step 406, the digital personal assistant is caused to present the synthesized alert regarding the same issue to a user. In an example implementation, causation logic 510 causes the digital personal assistant to present the synthesized alert 518 regarding the same issue to the user.

In an example embodiment, causing the digital personal assistant to present the synthesized alert at step 406 includes causing the digital personal assistant to present the synthesized alert regarding the same issue to the user based on at least a context of the user. For example, the digital personal assistant may be caused to be presented to the user based at least in part on the context of the user matching a reference context. In accordance with this example, the context of the user matching the reference context may serve as a trigger for causing the digital personal assistant to present the synthesized alert to the user. Alternatively or in addition, the enterprise alerts may be synthesized at step 404 based on at least the context of the user.

In some example embodiments, one or more steps 402, 404, and/or 406 of flowchart 400 may not be performed. Moreover, steps in addition to or in lieu of steps 402, 404, and/or 406 may be performed. For instance, in an example embodiment, the method of flowchart 400 further includes causing the digital personal assistant to suggest an operation for the user to perform to address the same issue with which the enterprise alerts relate. In one example, if the enterprise alerts relate to a problem encountered by a system in the enterprise, the digital personal assistant may be caused to suggest increasing capacity of the system, reducing a load of the system, focusing resolution efforts on a specified component of the system, or taking the system offline. In another example, if the enterprise alerts relate to a decrease in sales at the enterprise, the digital personal assistant may be caused to suggest following-up with one or more sales leads. In yet another example, if the enterprise alerts relate to a scheduling conflict, the digital personal assistant may be caused to suggest rescheduling one or more commitments (e.g., meetings). In an example implementation, causation logic 510 causes the digital personal assistant to suggest the operation. For instance, causation logic 510 may include a suggestion to perform the operation in the synthesized alert 518.

In another example embodiment, the method of flowchart 400 further includes causing the digital personal assistant to perform an operation on behalf of the user to address the same issue with which the enterprise alerts relate. For instance, causation logic 510 may cause the digital personal assistant to perform the operation on behalf of the user.

In yet another example embodiment, the method of flowchart 400 further includes determining that the enterprise alerts are received at a rate that is greater than a threshold rate. In an example implementation, determination logic 506 determines that the enterprise alerts 524 are received at a rate that is greater than the threshold rate. In accordance with this implementation, filter logic 504 may determine the rate at which the enterprise alerts 524 are received. In further accordance with this implementation, filter logic 504 may generate alert information 530 in response to determining the rate at which the enterprise alerts 524 are received. For instance, the alert information 530 may specify the rate at which the enterprise alerts 524 are received. In further accordance with this implementation, determination logic 506 may compare the rate that is specified by the alert information 530 and the threshold rate to determine that the enterprise alerts 524 are received at the rate that is greater than the threshold rate. In further accordance with this implementation, determination logic 506 may generate a presentation instruction 528 in response to determining that the enterprise alerts 524 are received at the rate that is greater than the threshold rate. The presentation instruction 528 may instruct causation logic 510 to cause the digital personal assistant to present the synthesized alert to the user.

In accordance with this embodiment, causing the digital personal assistant to present the synthesized alert at step 406 includes causing the digital personal assistant to present the synthesized alert regarding the same issue to the user in response to determining that the enterprise alerts are received at the rate that is greater than the threshold rate. For instance, causation logic 510 may cause the digital personal assistant to present the synthesized alert 518 in response to receipt of the presentation instruction 528.

In an aspect of this embodiment, filtering the enterprise alerts at step 402 includes filtering the enterprise alerts to determine that each of the enterprise alerts indicates that a designated threshold is exceeded. For instance, filter logic 504 may specify in the synthesis instruction 526 that each of the enterprise alerts 524 indicates that the designated threshold is exceeded. In accordance with this aspect, synthesizing the enterprise alerts at step 404 includes synthesizing the enterprise alerts to provide the synthesized alert, which indicates that the designated threshold is repetitively exceeded. For instance, synthesis logic 508 may provide the synthesized alert 518 to indicate that the designated threshold is repetitively exceeded based at least in part on the synthesis instruction specifying that each of the enterprise alerts 524 indicates that the designated threshold is exceeded.

In still another example embodiment, the method of flowchart 400 further includes determining that a specified user is not available to perform an operation to address the same issue with which the enterprise alerts relate. For example, determination logic 506 may determine that the specified user is not available to perform the operation. In accordance with this example, determination logic 506 may review user information 532 to determine the specified user is not available to perform the operation. For instance, the user information 532 may include information regarding availability of any one or more users. In one aspect, such information may be inferred based on factor(s), such as interactions of the user(s) with application(s), service(s), and/or device(s). In another aspect, such information may be explicitly specified by the user(s). In accordance with this example, determination logic 506 may generate a presentation instruction 528 in response to determining that the specified user is not available to perform the operation. The presentation instruction 528 may instruct causation logic 510 to cause the digital personal assistant to present the synthesized alert to the user.

In accordance with this embodiment, causing the digital personal assistant to present the synthesized alert at step 406 includes causing the digital personal assistant to present the synthesized alert regarding the same issue to the user further based on at least the specified user not being available to perform the operation to address the same issue with which the enterprise alerts relate. The digital personal assistant may be caused to present the synthesized alert at step 406 further based on at least the user being available to perform the operation, though the scope of the example embodiments is not limited in this respect. In an example implementation, causation logic 510 causes the digital personal assistant to present the synthesized alert 518 in response to receipt of the presentation instruction 528.

In yet another example embodiment, the method of flowchart 400 further includes determining that a role of the user in an enterprise is to perform an operation to address the same issue with which the enterprise alerts relate. For example, determination logic 506 may determine that the role of the user is to perform the operation. In accordance with this example, determination logic 506 may review the user information 532 to determine that the role of the user is to perform the operation. For instance, the user information 532 may specify role(s) of any one or more users. In one aspect, such information may be inferred from historical information (e.g., communications to and/or from the user(s), title(s) of the user(s)). In another aspect, such information may be explicitly specified by the user(s). In accordance with this example, determination logic 506 may generate a presentation instruction 528 in response to determining that the role of the user is to perform the operation. The presentation instruction 528 may instruct causation logic 510 to cause the digital personal assistant to present the synthesized alert 518 to the user.

In accordance with this embodiment, causing the digital personal assistant to present the synthesized alert at step 406 includes causing the digital personal assistant to present the synthesized alert regarding the same issue to the user based on at least the user having the role of performing the operation to address the same issue with which the enterprise alerts relate. For instance, causation logic 510 may cause the digital personal assistant to present the synthesized alert 518 in response to receipt of the presentation instruction 528.

In still another example embodiment, the method of flowchart 400 further includes determining that the enterprise alerts are relevant to a scheduled event of the designated user. For example, determination logic 506 may determine that the enterprise alerts 524 are relevant to the scheduled event of the designated user. In accordance with this example, determination logic 506 may review the user information 532 to determine that the enterprise alerts 524 are relevant to the scheduled event of the designated user. In an aspect of this example, filter logic 504 may provide the alert information 530 to identify subject matter with which the enterprise alerts 524 relate. In accordance with this aspect, determination logic 506 may compare the alert information 530 and the user information 532 to determine that the enterprise alerts 524 are relevant to the scheduled event of the designated user. In accordance with this example, determination logic 506 may generate a presentation instruction 528 in response to determining that the enterprise alerts 524 are relevant to the scheduled event of the designated user. The presentation instruction 528 may instruct causation logic 510 to cause the digital personal assistant to present the synthesized alert 518 to the user.

In accordance with this embodiment, causing the digital personal assistant to present the synthesized alert at step 406 includes causing the digital personal assistant to present the synthesized alert regarding the same issue to the user based on at least the scheduled event of the designated user being scheduled to occur within a threshold duration of time from a current time. For example, causation logic 510 may cause the digital personal assistant to present the synthesized alert 518 in response to receipt of the presentation instruction 528. In an aspect of this example, the user information 532 may indicate a time at which the scheduled event is scheduled to occur. In accordance with this aspect, determination logic 506 may review the user information 532 to determine the time at which the scheduled event is scheduled to occur. In further accordance with this aspect, determination logic 506 may compare the time at which the scheduled event is scheduled to occur to the current time. In further accordance with this aspect, determination logic 506 may generate the presentation instruction 528 further in response to a difference between the time at which the scheduled event is scheduled to occur and the current time being less than the threshold duration of time.

It will be recognized that computing system 500 may not include one or more of synthesized alert logic 502, filter logic 504, determination logic 506, synthesis logic 508, and/or causation logic 510. Furthermore, computing system 500 may include components in addition to or in lieu of synthesized alert logic 502, filter logic 504, determination logic 506, synthesis logic 508, and/or causation logic 510.

FIG. 6 depicts a flowchart 600 of an example method for presenting a synthesized alert based on at least an inferred relationship using a digital personal assistant in accordance with an embodiment. Flowchart 600 may be performed by synthesized alert logic 110 shown in FIG. 1, for example. For illustrative purposes, flowchart 600 is described with respect to computing system 700 shown in FIG. 7. Computing system 700 may include one or more of user systems 102A-102M, one or more of server(s) 106A-106N, or any combination thereof, though the scope of the example embodiments is not limited in this respect. Computing system 700 includes synthesized alert logic 702, which is an example of synthesized alert logic 110 according to an embodiment. As shown in FIG. 7, synthesized alert logic 702 includes determination logic 706, synthesis logic 708, causation logic 710, and inference logic 734. Further structural and operational embodiments will be apparent to persons skilled in the relevant art(s) based on the discussion regarding flowchart 600.

As shown in FIG. 6, the method of flowchart 600 begins at step 602. In step 602, a relationship between subsets of first information is inferred based on at least an analysis of the first information. In an example implementation, inference logic 734 infers the relationship between subsets of first information 736 based on at least an analysis of the first information 736. In accordance with this implementation, inference logic 734 may generate inference information 740 in response to inferring the relationship. For example, inference information 740 may indicate that the subsets are related. In accordance with this example, the inference information 740 may identify the relationship between the subsets.

At step 604, second information regarding the subsets is synthesized to provide the synthesized alert based on at least the subsets having the relationship. For example, the second information may be same as the first information. In another example, the second information may be different from the first information. In yet another example, the second information may include a portion (i.e., less than all) of the first information. In still another example, the second information may include at least a portion (e.g., all) of the first information (e.g., at least a portion (e.g., all) of one or more of the subsets). In yet another example, the second information may include none of the first information. In still another example, the second information may include description(s) of one or more of the subsets. The synthesized alert may be tailored to a user to whom the synthesized alert is to be presented, though the scope of the example embodiments is not limited in this respect. For instance, the second information may be selected for synthesis based at least in part on attributes of the user.

In an example implementation, synthesis logic 708 synthesizes second information 738 regarding the subsets to provide a synthesized alert 718 based on at least the subsets having the relationship. For example, synthesis logic 708 may synthesize the second information 738 in response to receipt of the inference information 740. In an aspect of this example, synthesis logic 708 may synthesize the second information 738 in response to the inference information 740 indicating that the subsets are related. In another aspect of this example, synthesis logic 708 may synthesize the second information 738 in response to the inference information 740 identifying the relationship between the subsets.

In an example embodiment, the synthesized alert is not requested by the user. For example, causation logic 710 may cause the digital personal assistant to present the synthesized alert 718 without being prompted by the user. In accordance with this example, causation logic 710 may proactively cause the digital personal assistant to present the synthesized alert 718 to the user.

At step 606, the digital personal assistant is caused to present the synthesized alert to a user. In an example implementation, causation logic 710 causes the digital personal assistant to present the synthesized alert 718.

In an example implementation, assume that first and second subsets of the first information include respective enterprise alerts, indicating that respective first and second machines have gone down (e.g., overheated, encountered a mechanical failure, or become infected by malware). Further assume that a third subset of the first information includes a failure history of the first machine, the second machine, and a third machine. In accordance with this implementation, inference logic 734 may infer that the third machine often goes down 30 minutes after the first and second machines go down based on the failure history. Inference logic 734 may therefore infer a relationship between the first, second, and third subsets. In further accordance with this implementation, synthesis logic 708 may synthesize the first and second enterprise alerts and the failure history to provide the synthesized alert 718 based on the first, second, and third subsets having the relationship. For instance, the synthesized alert 718 may state, "The first and second machines have just gone down, and the third machine is likely to go down within the next half hour."

In an example embodiment, causing the digital personal assistant to present the synthesized alert at step 606 includes causing the digital personal assistant to present the synthesized alert to the user based on at least a context of the user. For example, the digital personal assistant may be caused to be presented to the user based at least in part on the context of the user matching a reference context. In accordance with this example, the context of the user matching the reference context may serve as a trigger for causing the digital personal assistant to present the synthesized alert to the user. Alternatively or in addition, the second information may be synthesized at step 604 based on at least the context of the user.

In some example embodiments, one or more steps 602, 604, and/or 606 of flowchart 600 may not be performed. Moreover, steps in addition to or in lieu of steps 602, 604, and/or 606 may be performed. For instance, in an example embodiment, the method of flowchart 600 further includes determining that the user is to participate in a scheduled event. For instance, determination logic 706 may determine that the user is to participate in the scheduled event. For example, user information 732 may indicate that the user is to participate in the scheduled event. In accordance with this example, determination logic 706 may determine that the user is to participate in the scheduled event in response to receipt of the user information 732 (e.g., in response to the user information 732 indicating that the user is to participate in the scheduled event). In accordance with this embodiment, inferring the relationship at step 602 includes inferring that the subsets of the first information pertain to the scheduled event. In further accordance with this embodiment, causing the digital personal assistant to present the synthesized alert at step 606 includes causing the digital personal assistant to present the synthesized alert to the user based on at least a determination that the user is to participate in the scheduled event and further based on at least an inference that the subsets of the first information pertain to the scheduled event.

In an aspect of this embodiment, causing the digital personal assistant to present the synthesized alert at step 606 includes causing the digital personal assistant to present the synthesized alert to the user based on at least the scheduled event being scheduled to occur within a threshold duration of time from a current time.

In an example implementation of this embodiment, the subsets of the first information are documents. In accordance with this implementation, inference logic 734 infers that the documents would be helpful for creating a presentation that the user is scheduled to present at the scheduled event. In further accordance with this implementation, synthesis logic 708 may synthesize excerpts from the documents, names of the documents, paths to the documents, and/or links to the documents to provide the synthesized alert 718. In further accordance with this implementation, determination logic 706 may determine that the scheduled event is scheduled to occur in one hour. In further accordance with this implementation, causation logic 710 may cause the digital personal assistant to present the synthesized alert 718 to the user based on at least the inference that the documents would be helpful for creating the presentation and further based on at least the scheduled event being scheduled to occur in one hour. For instance, the synthesized alert 718 may state, "You haven't created your presentation, and you'll need to present it in an hour. Here is some information that might be helpful."

In another example embodiment, the method of flowchart 600 further includes receiving a first enterprise alert associated with a first time instance. The first enterprise alert indicates that an issue occurs in a system that is included in an enterprise. In accordance with this embodiment, the method of flowchart 600 further includes receiving a second enterprise alert associated with a second time instance that occurs after the first time instance. The second enterprise alert indicates that the issue is resolved. For instance, synthesis logic 708 may receive the first and second enterprise alerts. In further accordance with this embodiment, synthesizing the second information at step 604 includes synthesizing the first enterprise alert and the second enterprise alert to provide the synthesized alert that indicates that the system is not encountering the issue.

In yet another example embodiment, the method of flowchart 600 further includes causing the digital personal assistant to suggest an operation for the user to perform in response to the synthesized alert. For instance, causation logic 710 may cause the digital personal assistant to suggest the operation for the user to perform in response to the synthesized alert 718.

In still another example embodiment, the method of flowchart 600 further includes causing the digital personal assistant to perform an operation on behalf of the user. The operation pertains to at least one of the subsets of the first information. For instance, causation logic 710 may cause the digital personal assistant to perform the operation on behalf of the user. In accordance with this embodiment, the method of flowchart 600 further includes causing the digital personal assistant to notify the user that the operation has been performed. For example, causation logic 710 may cause the digital personal assistant to notify the user that the operation has been performed. In accordance with this example, causation logic 710 may cause the digital personal assistant to include a notification in the synthesized alert 718. The notification may indicate that the operation has been performed.

In another example embodiment, the method of flowchart 600 further includes determining that the subsets of the first information are received at a rate that is greater than a threshold rate. For example, determination logic 706 may determine that the subsets of the first information 736 are received at a rate that is greater than the threshold rate. In an aspect of this example, determination logic 706 may detect a number of the subsets that are received in a specified period of time to determine the rate at which the subsets are received. In accordance with this aspect, determination logic 706 may compare the rate at which the subsets are received to the threshold rate to determine that the subsets are received at the rate that is greater than the threshold rate. In accordance with this example, determination logic 706 may generate a presentation instruction 728 in response to determining that subsets of the first information 736 are received at the rate that is greater than the threshold rate. For instance, the presentation instruction 728 may instruct causation logic 710 to cause the digital personal assistant to present the synthesized alert 718 to the user.

In accordance with this embodiment, causing the digital personal assistant to present the synthesized alert at step 606 includes causing the digital personal assistant to present the synthesized alert to the user in response to determining that the subsets of the first information are received at the rate that is greater than the threshold rate. For example, causation logic 710 may cause the digital personal assistant to present the synthesized alert 718 to the user in response to receipt of the presentation instruction 728.

In yet another example embodiment, the method of flowchart 600 further includes determining that a specified user is not available to perform an operation to address an issue that is associated with the first information. For example, determination logic 706 may determine that the specified user is not available to perform the operation. In an aspect of this example, the user information 732 may indicate that the specified user is not available to perform the operation. In accordance with this aspect, determination logic 706 may determine that the specified user is not available to perform the operation based at least in part on the user information 732 indicating that the specified user is not available to perform the operation. In accordance with this example, determination logic 706 may generate a presentation instruction 728 in response to determining that the specified user is not available to perform the operation. For instance, the presentation instruction 728 may instruct causation logic 710 to cause the digital personal assistant to present the synthesized alert 718 to the user.

In accordance with this embodiment, causing the digital personal assistant to present the synthesized alert at step 606 includes causing the digital personal assistant to present the synthesized alert to the user based on at least the specified user not being available to perform the operation to address the issue that is associated with the first information. For example, causation logic 710 may cause the digital personal assistant to present the synthesized alert 718 to the user in response to receipt of the presentation instruction 728.

In still another example embodiment, the method of flowchart 600 further includes determining that a role of the user is to perform an operation to address an issue that is associated with the first information. For example, determination logic 706 may determine that the role of the user is to perform the operation. In accordance with this example, determination logic 706 may review the user information 732 to determine that the role of the user is to perform the operation. In accordance with this example, determination logic 706 may generate a presentation instruction 728 in response to determining that the role of the user is to perform the operation. The presentation instruction 728 may instruct causation logic 710 to cause the digital personal assistant to present the synthesized alert 718 to the user.

In accordance with this embodiment, causing the digital personal assistant to present the synthesized alert at step 606 includes causing the digital personal assistant to present the synthesized alert to the user based on at least the user having the role of performing the operation to address the issue that is associated with the first information. For instance, causation logic 710 may cause the digital personal assistant to present the synthesized alert 718 in response to receipt of the presentation instruction 728.

In yet another example embodiment, the method of flowchart 600 further includes determining that the subsets of the first information are relevant to a scheduled event of the user. For example, determination logic 706 may determine that the subsets of the first information 736 are relevant to the scheduled event of the user. In accordance with this example, determination logic 706 may review the user information 732 to determine that the subsets are relevant to the scheduled event of the user. In an aspect of this example, inference logic 734 may provide a subject matter indicator 730 to identify subject matter with which the subsets of the first information 736 relate. In accordance with this aspect, determination logic 706 may compare the subject matter indicator 730 and the user information 732 to determine that the subsets of the first information 736 are relevant to the scheduled event of the user. In accordance with this example, determination logic 706 may generate a presentation instruction 728 in response to determining that the subsets of the first information 736 are relevant to the scheduled event of the user. The presentation instruction 728 may instruct causation logic 710 to cause the digital personal assistant to present the synthesized alert 718 to the user.

In accordance with this embodiment, causing the digital personal assistant to present the synthesized alert at step 606 includes causing the digital personal assistant to present the synthesized alert to the user based on at least the scheduled event of the user being scheduled to occur within a threshold duration of time from a current time. For example, causation logic 710 may cause the digital personal assistant to present the synthesized alert 718 in response to receipt of the presentation instruction 728. In an aspect of this example, the user information 732 may indicate a time at which the scheduled event is scheduled to occur. In accordance with this aspect, determination logic 706 may review the user information 732 to determine the time at which the scheduled event is scheduled to occur. In further accordance with this aspect, determination logic 706 may compare the time at which the scheduled event is scheduled to occur to the current time. In further accordance with this aspect, determination logic 706 may generate the presentation instruction 728 further in response to a difference between the time at which the scheduled event is scheduled to occur and the current time being less than the threshold duration of time.

In an example implementation of this embodiment, the scheduled event may be a meeting, and the subsets of the first information may indicate events that have occurred since a previous meeting. In accordance with this implementation, the second information may include a description of each of the events that have occurred since the previous meeting. In further accordance with this implementation, synthesis logic 708 may synthesize the descriptions of the events to provide the synthesized alert 718. In further accordance with this implementation, causation logic 710 may cause the digital personal assistant to present the synthesized alert 718 based at least in part on the meeting being scheduled to start within the next 30 minutes.

It will be recognized that computing system 700 may not include one or more of synthesized alert logic 702, determination logic 706, synthesis logic 708, causation logic 710, and/or inference logic 734. Furthermore, computing system 700 may include components in addition to or in lieu of synthesized alert logic 702, determination logic 706, synthesis logic 708, causation logic 710, and/or inference logic 734.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any one or more of digital personal assistants 108A-108M, synthesized alert logic 110, synthesized alert logic 302, analysis logic 304, determination logic 306, synthesis logic 308, causation logic 310, synthesized alert logic 502, filter logic 504, determination logic 506, synthesis logic 508, causation logic 510, synthesized alert logic 702, determination logic 706, synthesis logic 708, causation logic 710, inference logic 734, flowchart 200, flowchart 400, and/or flowchart 600 may be implemented in hardware, software, firmware, or any combination thereof.

For example, any one or more of digital personal assistants 108A-108M, synthesized alert logic 110, synthesized alert logic 302, analysis logic 304, determination logic 306, synthesis logic 308, causation logic 310, synthesized alert logic 502, filter logic 504, determination logic 506, synthesis logic 508, causation logic 510, synthesized alert logic 702, determination logic 706, synthesis logic 708, causation logic 710, inference logic 734, flowchart 200, flowchart 400, and/or flowchart 600 may be implemented, at least in part, as computer program code configured to be executed in one or more processors.

In another example, any one or more of digital personal assistants 108A-108M, synthesized alert logic 110, synthesized alert logic 302, analysis logic 304, determination logic 306, synthesis logic 308, causation logic 310, synthesized alert logic 502, filter logic 504, determination logic 506, synthesis logic 508, causation logic 510, synthesized alert logic 702, determination logic 706, synthesis logic 708, causation logic 710, inference logic 734, flowchart 200, flowchart 400, and/or flowchart 600 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

In a first example method of synthesizing alerts using a digital personal assistant, information regarding one or more users is analyzed to determine one or more associations of the one or more users. A relationship between alerts is determined. The alerts are synthesized to provide a synthesized alert based on at least the relationship. The digital personal assistant is caused to present the synthesized alert to a designated user based on at least the one or more associations.

In a first aspect of the first example method, analyzing the information comprises analyzing the information regarding the one or more users to determine a relationship between the designated user and at least one second user. In accordance with the first aspect, causing the digital personal assistant to present the synthesized alert comprises causing the digital personal assistant to present the synthesized alert to the designated user based on at least the relationship between the designated user and the at least one second user.

In a second aspect of the first example method, analyzing the information comprises analyzing the information regarding the one or more users to determine at least one interaction between the designated user and at least one second user. In accordance with the second aspect, causing the digital personal assistant to present the synthesized alert comprises causing the digital personal assistant to present the synthesized alert to the designated user based on at least the interaction. The second aspect of the first example method may be implemented in combination with the first aspect of the first example method, though the example embodiments are not limited in this respect.

In a third aspect of the first example method, determining the relationship comprises determining the relationship between a plurality of subsets of the alerts that are received from a plurality of respective systems. The third aspect of the first example method may be implemented in combination with the first and/or second aspect of the first example method, though the example embodiments are not limited in this respect.

In a fourth aspect of the first example method, the alerts include one or more enterprise alerts and one or more personal alerts. In accordance with the fourth aspect, determining the relationship comprises determining the relationship between the one or more enterprise alerts and the one or more personal alerts. In further accordance with the fourth aspect, synthesizing the alerts comprises synthesizing the one or more enterprise alerts and the one or more personal alerts to provide the synthesized alert. The fourth aspect of the first example method may be implemented in combination with the first, second, and/or third aspect of the first example method, though the example embodiments are not limited in this respect.

In a fifth aspect of the first example method, causing the digital personal assistant to present the synthesized alert comprises causing the digital personal assistant to present the synthesized alert to the designated user further based on at least a context of the designated user. The fifth aspect of the first example method may be implemented in combination with the first, second, third, and/or fourth aspect of the first example method, though the example embodiments are not limited in this respect.

In a sixth aspect of the first example method, the first example method further comprises causing the digital personal assistant to suggest an operation for the designated user to perform to address an issue identified by the synthesized alert. The sixth aspect of the first example method may be implemented in combination with the first, second, third, fourth, and/or fifth aspect of the first example method, though the example embodiments are not limited in this respect.

In a seventh aspect of the first example method, the first example method further comprises causing the digital personal assistant to perform an operation on behalf of the designated user to address an issue identified by the synthesized alert. The seventh aspect of the first example method may be implemented in combination with the first, second, third, fourth, fifth, and/or sixth aspect of the first example method, though the example embodiments are not limited in this respect.

In an eighth aspect of the first example method, the first example method further comprises determining that the alerts are received at a rate that is greater than a threshold rate. In accordance with the eighth aspect, causing the digital personal assistant to present the synthesized alert comprises causing the digital personal assistant to present the synthesized alert to the designated user in response to determining that the alerts are received at the rate that is greater than the threshold rate. The eighth aspect of the first example method may be implemented in combination with the first, second, third, fourth, fifth, sixth, and/or seventh aspect of the first example method, though the example embodiments are not limited in this respect.

In an example of the eighth aspect of the first example method, determining the relationship between the alerts comprises determining that each of the alerts indicates that a designated threshold is exceeded. In accordance with this example, synthesizing the alerts to provide the synthesized alert comprises synthesizing the alerts to provide the synthesized alert, which indicates that the designated threshold is repetitively exceeded.

In a ninth aspect of the first example method, the first example method further comprises determining that a specified user is not available to perform an operation to address an issue that is associated with the alerts. In accordance with the ninth aspect, causing the digital personal assistant to present the synthesized alert comprises causing the digital personal assistant to present the synthesized alert to the designated user further based on at least the specified user not being available to perform the operation to address the issue that is associated with the alerts. The ninth aspect of the first example method may be implemented in combination with the first, second, third, fourth, fifth, sixth, seventh, and/or eighth aspect of the first example method, though the example embodiments are not limited in this respect.

In a tenth aspect of the first example method, the alerts include enterprise alerts. In accordance with the tenth aspect, the first example method further comprises determining that a role of the designated user in an enterprise is to perform an operation to address an issue that is associated with the enterprise alerts. In further accordance with the tenth aspect, causing the digital personal assistant to present the synthesized alert comprises causing the digital personal assistant to present the synthesized alert to the designated user further based on at least the designated user having the role of performing the operation to address the issue that is associated with the enterprise alerts. The tenth aspect of the first example method may be implemented in combination with the first, second, third, fourth, fifth, sixth, seventh, eighth, and/or ninth aspect of the first example method, though the example embodiments are not limited in this respect.

In an eleventh aspect of the first example method, determining the relationship comprises determining that the alerts are relevant to a scheduled event of the designated user. In accordance with the eleventh aspect, causing the digital personal assistant to present the synthesized alert comprises causing the digital personal assistant to present the synthesized alert to the designated user further based on at least the scheduled event of the designated user being scheduled to occur within a threshold duration of time from a current time. The eleventh aspect of the first example method may be implemented in combination with the first, second, third, fourth, fifth, sixth, seventh, eighth, ninth, and/or tenth aspect of the first example method, though the example embodiments are not limited in this respect.

In a second example method of synthesizing enterprise alerts using a digital personal assistant, the enterprise alerts are filtered to determine a same issue with which the enterprise alerts relate. The enterprise alerts are synthesized to provide a synthesized alert. The digital personal assistant is caused to present the synthesized alert regarding the same issue to a user.

In a first aspect of the second example method, filtering the enterprise alerts comprises filtering a plurality of subsets of the enterprise alerts that are received from a plurality of respective systems in an enterprise to determine the same issue with which the subsets relate.

In a second aspect of the second example method, causing the digital personal assistant to present the synthesized alert comprises causing the digital personal assistant to present the synthesized alert regarding the same issue to the user based on at least a context of the user. The second aspect of the second example method may be implemented in combination with the first aspect of the second example method, though the example embodiments are not limited in this respect.

In a third aspect of the second example method, the second example method further comprises causing the digital personal assistant to suggest an operation for the user to perform to address the same issue with which the enterprise alerts relate. The third aspect of the second example method may be implemented in combination with the first and/or second aspect of the second example method, though the example embodiments are not limited in this respect.

In a fourth aspect of the second example method, the second example method further comprises causing the digital personal assistant to perform an operation on behalf of the user to address the same issue with which the enterprise alerts relate. The fourth aspect of the second example method may be implemented in combination with the first, second, and/or third aspect of the second example method, though the example embodiments are not limited in this respect.

In a fifth aspect of the second example method, the second example method further comprises determining that the enterprise alerts are received at a rate that is greater than a threshold rate. In accordance with the fifth aspect, causing the digital personal assistant to present the synthesized alert comprises causing the digital personal assistant to present the synthesized alert regarding the same issue to the user in response to determining that the enterprise alerts are received at the rate that is greater than the threshold rate. The fifth aspect of the second example method may be implemented in combination with the first, second, third, and/or fourth aspect of the second example method, though the example embodiments are not limited in this respect.

In an example of the fifth aspect of the second example method, filtering the enterprise alerts comprises filtering the enterprise alerts to determine that each of the enterprise alerts indicates that a designated threshold is exceeded. In accordance with this example, synthesizing the enterprise alerts to provide the synthesized alert comprises synthesizing the enterprise alerts to provide the synthesized alert, which indicates that the designated threshold is repetitively exceeded.

In a sixth aspect of the second example method, the second example method further comprises determining that a specified user is not available to perform an operation to address the same issue with which the enterprise alerts relate. In accordance with the sixth aspect, causing the digital personal assistant to present the synthesized alert comprises causing the digital personal assistant to present the synthesized alert regarding the same issue to the user further based on at least the specified user not being available to perform the operation to address the same issue with which the enterprise alerts relate. The sixth aspect of the second example method may be implemented in combination with the first, second, third, fourth, and/or fifth aspect of the second example method, though the example embodiments are not limited in this respect.

In a seventh aspect of the second example method, the second example method further comprises determining that a role of the user in an enterprise is to perform an operation to address the same issue with which the enterprise alerts relate. In accordance with the seventh aspect, causing the digital personal assistant to present the synthesized alert comprises causing the digital personal assistant to present the synthesized alert regarding the same issue to the user based on at least the user having the role of performing the operation to address the same issue with which the enterprise alerts relate. The seventh aspect of the second example method may be implemented in combination with the first, second, third, fourth, fifth, and/or sixth aspect of the second example method, though the example embodiments are not limited in this respect.

In an eighth aspect of the second example method, the second example method further comprises determining that the enterprise alerts are relevant to a scheduled event of the designated user. In accordance with the eighth aspect, causing the digital personal assistant to present the synthesized alert comprises causing the digital personal assistant to present the synthesized alert regarding the same issue to the user based on at least the scheduled event of the designated user being scheduled to occur within a threshold duration of time from a current time. The eighth aspect of the second example method may be implemented in combination with the first, second, third, fourth, fifth, sixth, and/or seventh aspect of the second example method, though the example embodiments are not limited in this respect.

In a third example method of presenting a synthesized alert based on at least an inferred relationship using a digital personal assistant, a relationship between subsets of first information is inferred based on at least an analysis of the first information. Second information regarding the subsets is synthesized to provide the synthesized alert based on at least the subsets having the relationship. The digital personal assistant is caused to present the synthesized alert to a user.

In a first aspect of the third example method, synthesizing the second information comprises synthesizing the second information to provide the synthesized alert that is not requested by the user based on at least the subsets having the relationship.

In a second aspect of the third example method, causing the digital personal assistant to present the synthesized alert comprises causing the digital personal assistant to present the synthesized alert to the user based on at least a context of the user. The second aspect of the third example method may be implemented in combination with the first aspect of the third example method, though the example embodiments are not limited in this respect.

In a third aspect of the third example method, the third example method further comprises determining that the user is to participate in a scheduled event. In accordance with the third aspect, inferring the relationship comprises inferring that the subsets of the first information pertain to the scheduled event. In further accordance with the third aspect, causing the digital personal assistant to present the synthesized alert comprises causing the digital personal assistant to present the synthesized alert to the user based on at least a determination that the user is to participate in the scheduled event and further based on at least an inference that the subsets of the first information pertain to the scheduled event. The third aspect of the third example method may be implemented in combination with the first and/or second aspect of the third example method, though the example embodiments are not limited in this respect.

In an example of the third aspect of the third example method, causing the digital personal assistant to present the synthesized alert comprises causing the digital personal assistant to present the synthesized alert to the user based on at least the scheduled event being scheduled to occur within a threshold duration of time from a current time.

In a fourth aspect of the third example method, the third example method further comprises receiving a first enterprise alert associated with a first time instance. The first enterprise alert indicates that an issue occurs in a system that is included in an enterprise. In accordance with the fourth aspect, the third example method further comprises receiving a second enterprise alert associated with a second time instance that occurs after the first time instance, the second enterprise alert indicating that the issue is resolved. In further accordance with the fourth aspect, synthesizing the second information comprises synthesizing the first enterprise alert and the second enterprise alert to provide the synthesized alert that indicates that the system is not encountering the issue. The fourth aspect of the third example method may be implemented in combination with the first, second, and/or third aspect of the third example method, though the example embodiments are not limited in this respect.

In a fifth aspect of the third example method, the third example method further comprises causing the digital personal assistant to suggest an operation for the user to perform in response to the synthesized alert. The fifth aspect of the third example method may be implemented in combination with the first, second, third, and/or fourth aspect of the third example method, though the example embodiments are not limited in this respect.

In a sixth aspect of the third example method, the third example method further comprises causing the digital personal assistant to perform an operation on behalf of the user. The operation pertains to at least one of the subsets of the first information. In accordance with the sixth aspect, the third example method further comprises causing the digital personal assistant to notify the user that the operation has been performed. The sixth aspect of the third example method may be implemented in combination with the first, second, third, fourth, and/or fifth aspect of the third example method, though the example embodiments are not limited in this respect.

In a seventh aspect of the third example method, the third example method further comprises determining that the subsets of the first information are received at a rate that is greater than a threshold rate. In accordance with the seventh aspect, causing the digital personal assistant to present the synthesized alert comprises causing the digital personal assistant to present the synthesized alert to the user in response to determining that the subsets of the first information are received at the rate that is greater than the threshold rate. The seventh aspect of the third example method may be implemented in combination with the first, second, third, fourth, fifth, and/or sixth aspect of the third example method, though the example embodiments are not limited in this respect.

In an eighth aspect of the third example method, the third example method further comprises determining that a specified user is not available to perform an operation to address an issue that is associated with the first information. In accordance with the eighth aspect, causing the digital personal assistant to present the synthesized alert comprises causing the digital personal assistant to present the synthesized alert to the user based on at least the specified user not being available to perform the operation to address the issue that is associated with the first information. The eighth aspect of the third example method may be implemented in combination with the first, second, third, fourth, fifth, sixth, and/or seventh aspect of the third example method, though the example embodiments are not limited in this respect.

In a ninth aspect of the third example method, the third example method further comprises determining that a role of the user is to perform an operation to address an issue that is associated with the first information. In accordance with the ninth aspect, causing the digital personal assistant to present the synthesized alert comprises causing the digital personal assistant to present the synthesized alert to the user based on at least the user having the role of performing the operation to address the issue that is associated with the first information. The ninth aspect of the third example method may be implemented in combination with the first, second, third, fourth, fifth, sixth, seventh, and/or eighth aspect of the third example method, though the example embodiments are not limited in this respect.

In a tenth aspect of the third example method, the third example method further comprises determining that the subsets of the first information are relevant to a scheduled event of the user. In accordance with the tenth aspect, causing the digital personal assistant to present the synthesized alert comprises causing the digital personal assistant to present the synthesized alert to the user based on at least the scheduled event of the user being scheduled to occur within a threshold duration of time from a current time. The tenth aspect of the third example method may be implemented in combination with the first, second, third, fourth, fifth, sixth, seventh, eighth, and/or ninth aspect of the third example method, though the example embodiments are not limited in this respect.

A first example system to synthesize alerts using a digital personal assistant comprises at least one element comprising at least one of (a) a processor, (b) hardware logic, or (c) electrical circuitry. The first example system further comprises analysis logic, implemented using the at least one element, configured to analyze information regarding one or more users to determine one or more associations of the one or more users. The first example system further comprises determination logic, implemented using the at least one element, configured to determine a relationship between alerts. The first example system further comprises synthesis logic, implemented using the at least one element, configured to synthesize the alerts to provide a synthesized alert based on at least the relationship. The first example system further comprises causation logic, implemented using the at least one element, configured to cause the digital personal assistant to present the synthesized alert to a designated user based on at least the one or more associations.

In a first aspect of the first example system, the analysis logic is configured to analyze the information regarding the one or more users to determine a relationship between the designated user and at least one second user. In accordance with the first aspect, the causation logic is configured to cause the digital personal assistant to present the synthesized alert to the designated user based on at least the relationship between the designated user and the at least one second user.

In a second aspect of the first example system, the analysis logic is configured to analyze the information regarding the one or more users to determine at least one interaction between the designated user and at least one second user. In accordance with the second aspect, the causation logic is configured to cause the digital personal assistant to present the synthesized alert to the designated user based on at least the interaction. The second aspect of the first example system may be implemented in combination with the first aspect of the first example system, though the example embodiments are not limited in this respect.

In a third aspect of the first example system, the determination logic is configured to determine the relationship between a plurality of subsets of the alerts that are received from a plurality of respective systems. The third aspect of the first example system may be implemented in combination with the first and/or second aspect of the first example system, though the example embodiments are not limited in this respect.

In a fourth aspect of the first example system, the alerts include one or more enterprise alerts and one or more personal alerts. In accordance with the fourth aspect, the determination logic is configured to determine the relationship between the one or more enterprise alerts and the one or more personal alerts. In further accordance with the fourth aspect, the synthesis logic is configured to synthesize the one or more enterprise alerts and the one or more personal alerts to provide the synthesized alert. The fourth aspect of the first example system may be implemented in combination with the first, second, and/or third aspect of the first example system, though the example embodiments are not limited in this respect.

In a fifth aspect of the first example system, the causation logic is configured to cause the digital personal assistant to present the synthesized alert to the designated user further based on at least a context of the designated user. The fifth aspect of the first example system may be implemented in combination with the first, second, third, and/or fourth aspect of the first example system, though the example embodiments are not limited in this respect.

In a sixth aspect of the first example system, the causation logic is configured to cause the digital personal assistant to suggest an operation for the designated user to perform to address an issue identified by the synthesized alert. The sixth aspect of the first example system may be implemented in combination with the first, second, third, fourth, and/or fifth aspect of the first example system, though the example embodiments are not limited in this respect.

In a seventh aspect of the first example system, the causation logic is configured to cause the digital personal assistant to perform an operation on behalf of the designated user to address an issue identified by the synthesized alert. The seventh aspect of the first example system may be implemented in combination with the first, second, third, fourth, fifth, and/or sixth aspect of the first example system, though the example embodiments are not limited in this respect.

In an eighth aspect of the first example system, the determination logic is configured to determine whether the alerts are received at a rate that is greater than a threshold rate. In accordance with the eighth aspect, the causation logic is configured to cause the digital personal assistant to present the synthesized alert to the designated user in response to a determination that the alerts are received at the rate that is greater than the threshold rate. The eighth aspect of the first example system may be implemented in combination with the first, second, third, fourth, fifth, sixth, and/or seventh aspect of the first example system, though the example embodiments are not limited in this respect.

In an example of the eighth aspect of the first example system, the determination logic is configured to determine whether each of the alerts indicates that a designated threshold is exceeded. In accordance with this example, the synthesis logic is configured to synthesize the alerts to provide the synthesized alert, which indicates that the designated threshold is repetitively exceeded, in response to a determination that each of the alerts indicates that the designated threshold is exceeded.

In a ninth aspect of the first example system, the determination logic is configured to determine whether a specified user is available to perform an operation to address an issue that is associated with the alerts. In accordance with the ninth aspect, the causation logic is configured to cause the digital personal assistant to present the synthesized alert to the designated user further based on at least a determination that the specified user is not available to perform the operation to address the issue that is associated with the alerts. The ninth aspect of the first example system may be implemented in combination with the first, second, third, fourth, fifth, sixth, seventh, and/or eighth aspect of the first example system, though the example embodiments are not limited in this respect.

In a tenth aspect of the first example system, the alerts include enterprise alerts. In accordance with the tenth aspect, the determination logic is configured to determine whether a role of the designated user in an enterprise is to perform an operation to address an issue that is associated with the enterprise alerts. In accordance with the tenth aspect, the causation logic is configured to cause the digital personal assistant to present the synthesized alert to the designated user further based on at least a determination that the role of the designated user in the enterprise is to perform the operation to address the issue that is associated with the enterprise alerts. The tenth aspect of the first example system may be implemented in combination with the first, second, third, fourth, fifth, sixth, seventh, eighth, and/or ninth aspect of the first example system, though the example embodiments are not limited in this respect.

In an eleventh aspect of the first example system, the determination logic is configured to determine whether the alerts are relevant to a scheduled event of the designated user. In accordance with the eleventh aspect, the causation logic is configured to cause the digital personal assistant to present the synthesized alert to the designated user further based on at least a determination that the enterprise alerts are relevant to the scheduled event of the designated user and further based on at least the scheduled event of the designated user being scheduled to occur within a threshold duration of time from a current time. The eleventh aspect of the first example system may be implemented in combination with the first, second, third, fourth, fifth, sixth, seventh, eighth, ninth, and/or tenth aspect of the first example system, though the example embodiments are not limited in this respect.

A second example system to synthesize enterprise alerts using a digital personal assistant comprises at least one element comprising at least one of (a) a processor, (b) hardware logic, or (c) electrical circuitry. The second example system further comprises filter logic, implemented using the at least one element, configured to filter the enterprise alerts to determine a same issue with which the enterprise alerts relate. The second example system further comprises synthesis logic, implemented using the at least one element, configured to synthesize the enterprise alerts to provide a synthesized alert. The second example system further comprises causation logic, implemented using the at least one element, configured to cause the digital personal assistant to present the synthesized alert regarding the same issue to a user.

In a first aspect of the second example system, the filter logic is configured to filter a plurality of subsets of the enterprise alerts that are received from a plurality of respective systems in an enterprise to determine the same issue with which the subsets relate.

In a second aspect of the second example system, the causation logic is configured to cause the digital personal assistant to present the synthesized alert regarding the same issue to the user based on at least a context of the user. The second aspect of the second example system may be implemented in combination with the first aspect of the second example system, though the example embodiments are not limited in this respect.

In a third aspect of the second example system, the causation logic is configured to cause the digital personal assistant to suggest an operation for the user to perform to address the same issue with which the enterprise alerts relate. The third aspect of the second example system may be implemented in combination with the first and/or second aspect of the second example system, though the example embodiments are not limited in this respect.

In a fourth aspect of the second example system, the causation logic is configured to cause the digital personal assistant to perform an operation on behalf of the user to address the same issue with which the enterprise alerts relate. The fourth aspect of the second example system may be implemented in combination with the first, second, and/or third aspect of the second example system, though the example embodiments are not limited in this respect.

In a fifth aspect of the second example system, the second example system further comprises determination logic configured to determine whether the enterprise alerts are received at a rate that is greater than a threshold rate. In accordance with the fifth aspect, the causation logic is configured to cause the digital personal assistant to present the synthesized alert regarding the same issue to the user in response to a determination that the enterprise alerts are received at the rate that is greater than the threshold rate. The fifth aspect of the second example system may be implemented in combination with the first, second, third, and/or fourth aspect of the second example system, though the example embodiments are not limited in this respect.

In an example of the fifth aspect of the second example system, the filter logic is configured to filter the enterprise alerts to determine whether each of the enterprise alerts indicates that a designated threshold is exceeded. In accordance with the fifth aspect, the synthesis logic is configured to synthesize the enterprise alerts to provide the synthesized alert, which indicates that the designated threshold is repetitively exceeded, in response to a determination that each of the enterprise alerts indicates that the designated threshold is exceeded.

In a sixth aspect of the second example system, the second example system further comprises determination logic configured to determine whether a specified user is available to perform an operation to address the same issue with which the enterprise alerts relate. In accordance with the sixth aspect, the causation logic is configured to cause the digital personal assistant to present the synthesized alert regarding the same issue to the user further based on at least a determination that the specified user is not available to perform the operation to address the same issue with which the enterprise alerts relate. The sixth aspect of the second example system may be implemented in combination with the first, second, third, fourth, and/or fifth aspect of the second example system, though the example embodiments are not limited in this respect.

In a seventh aspect of the second example system, the second example system further comprises determination logic configured to determine whether a role of the user in an enterprise is to perform an operation to address the same issue with which the enterprise alerts relate. In accordance with the seventh aspect, the causation logic is configured to cause the digital personal assistant to present the synthesized alert regarding the same issue to the user based on at least a determination that the role of the user in the enterprise is to perform the operation to address the same issue with which the enterprise alerts relate. The seventh aspect of the second example system may be implemented in combination with the first, second, third, fourth, fifth, and/or sixth aspect of the second example system, though the example embodiments are not limited in this respect.

In an eighth aspect of the second example system, the second example system further comprises determination logic configured to determine whether the enterprise alerts are relevant to a scheduled event of the designated user. In accordance with the eighth aspect, the causation logic is configured to cause the digital personal assistant to present the synthesized alert regarding the same issue to the user based on at least a determination that the enterprise alerts are relevant to the scheduled event of the designated user and further based on at least the scheduled event of the designated user being scheduled to occur within a threshold duration of time from a current time. The eighth aspect of the second example system may be implemented in combination with the first, second, third, fourth, fifth, sixth, and/or seventh aspect of the second example system, though the example embodiments are not limited in this respect.

A third example system to present a synthesized alert based on at least an inferred relationship using a digital personal assistant comprises at least one element comprising at least one of (a) a processor, (b) hardware logic, or (c) electrical circuitry. The third example system further comprises inference logic, implemented using the at least one element, configured to infer a relationship between subsets of first information based on at least an analysis of the first information. The third example system further comprises synthesis logic, implemented using the at least one element, configured to synthesize second information regarding the subsets to provide the synthesized alert based on at least the subsets having the relationship. The third example system further comprises causation logic, implemented using the at least one element, configured to cause the digital personal assistant to present the synthesized alert to a user.

In a first aspect of the third example system, the synthesized alert is not requested by the user.

In a second aspect of the third example system, the causation logic is configured to cause the digital personal assistant to present the synthesized alert to the user based on at least a context of the user. The second aspect of the third example system may be implemented in combination with the first aspect of the third example system, though the example embodiments are not limited in this respect.

In a third aspect of the third example system, the third example system further comprises determination logic configured to determining whether the user is to participate in a scheduled event. In accordance with the third aspect, the inference logic is configured to infer whether the subsets of the first information pertain to the scheduled event. In further accordance with the third aspect, the causation logic is configured to cause the digital personal assistant to present the synthesized alert to the user based on at least a determination that the user is to participate in the scheduled event and further based on at least an inference that the subsets of the first information pertain to the scheduled event. The third aspect of the third example system may be implemented in combination with the first and/or second aspect of the third example system, though the example embodiments are not limited in this respect.

In an example of the third aspect of the third example system, the causation logic is configured to cause the digital personal assistant to present the synthesized alert to the user based on at least the scheduled event being scheduled to occur within a threshold duration of time from a current time.

In a fourth aspect of the third example system, the first information comprises a first subset that includes a first enterprise alert associated with a first time instance. The first enterprise alert indicates that an issue occurs in a system that is included in an enterprise. In accordance with the fourth aspect, the first information further comprises a second subset that includes a second enterprise alert associated with a second time instance that occurs after the first time instance. The second enterprise alert indicates that the issue is resolved. In further accordance with the fourth aspect, the synthesis logic is configured to synthesize the first enterprise alert and the second enterprise alert to provide the synthesized alert that indicates that the system is not encountering the issue. The fourth aspect of the third example system may be implemented in combination with the first, second, and/or third aspect of the third example system, though the example embodiments are not limited in this respect.

In a fifth aspect of the third example system, the causation logic is configured to cause the digital personal assistant to suggest an operation for the user to perform in response to the synthesized alert. The fifth aspect of the third example system may be implemented in combination with the first, second, third, and/or fourth aspect of the third example system, though the example embodiments are not limited in this respect.

In a sixth aspect of the third example system, the causation logic is configured to cause the digital personal assistant to perform an operation on behalf of the user. The operation pertains to at least one of the subsets of the first information. In accordance with the sixth aspect, the causation logic is configured to cause the digital personal assistant to notify the user that the operation has been performed. The sixth aspect of the third example system may be implemented in combination with the first, second, third, fourth, and/or fifth aspect of the third example system, though the example embodiments are not limited in this respect.

In a seventh aspect of the third example system, the third example system further comprises determination logic configured to determine whether the subsets of the first information are received at a rate that is greater than a threshold rate. In accordance with the seventh aspect, the causation logic is configured to cause the digital personal assistant to present the synthesized alert to the user in response to a determination that the subsets of the first information are received at the rate that is greater than the threshold rate. The seventh aspect of the third example system may be implemented in combination with the first, second, third, fourth, fifth, and/or sixth aspect of the third example system, though the example embodiments are not limited in this respect.

In an eighth aspect of the third example system, the third example system further comprises determination logic configured to determine whether a specified user is available to perform an operation to address an issue that is associated with the first information. In accordance with the eighth aspect, the causation logic is configured to cause the digital personal assistant to present the synthesized alert to the user based on at least a determination that the specified user is not available to perform the operation to address the issue that is associated with the first information. The eighth aspect of the third example system may be implemented in combination with the first, second, third, fourth, fifth, sixth, and/or seventh aspect of the third example system, though the example embodiments are not limited in this respect.

In a ninth aspect of the third example system, the third example system further comprises determination logic configured to determine whether a role of the user is to perform an operation to address an issue that is associated with the first information. In accordance with the ninth aspect, the causation logic is configured to cause the digital personal assistant to present the synthesized alert to the user based on at least a determination that the role of the user is to perform the operation to address the issue that is associated with the first information. The ninth aspect of the third example system may be implemented in combination with the first, second, third, fourth, fifth, sixth, seventh, and/or eighth aspect of the third example system, though the example embodiments are not limited in this respect.

In a tenth aspect of the third example system, the third example system further comprises determination logic configured to determine whether the subsets of the first information are relevant to a scheduled event of the user. In accordance with the tenth aspect, the causation logic is configured to cause the digital personal assistant to present the synthesized alert to the user based on at least a determination that the subsets of the first information are relevant to the scheduled event of the user and further based on at least the scheduled event of the user being scheduled to occur within a threshold duration of time from a current time. The tenth aspect of the third example system may be implemented in combination with the first, second, third, fourth, fifth, sixth, seventh, eighth, and/or ninth aspect of the third example system, though the example embodiments are not limited in this respect.

A first example computer program product comprises a computer-readable storage medium having computer program logic recorded thereon for enabling a processor-based system to synthesize alerts using a digital personal assistant. The computer program logic comprises first program logic for enabling the processor-based system to analyze information regarding one or more users to determine one or more associations of the one or more users. The computer program logic further comprises second program logic for enabling the processor-based system to determine a relationship between alerts. The computer program logic further comprises third program logic for enabling the processor-based system to synthesize the alerts to provide a synthesized alert based on at least the relationship. The computer program logic further comprises fourth program logic for enabling the processor-based system to cause the digital personal assistant to present the synthesized alert to a designated user based on at least the one or more associations.

A second example computer program product comprises a computer-readable storage medium having computer program logic recorded thereon for enabling a processor-based system to synthesize enterprise alerts using a digital personal assistant. The computer program logic comprises first program logic for enabling the processor-based system to filter the enterprise alerts to determine a same issue with which the enterprise alerts relate. The computer program logic further comprises second program logic for enabling the processor-based system to synthesize the enterprise alerts to provide a synthesized alert. The computer program logic further comprises third program logic for enabling the processor-based system to cause the digital personal assistant to present the synthesized alert regarding the same issue to a user.

A third example computer program product comprises a computer-readable storage medium having computer program logic recorded thereon for enabling a processor-based system to present a synthesized alert based on at least an inferred relationship using a digital personal assistant. The computer program logic comprises first program logic for enabling the processor-based system to infer a relationship between subsets of first information based on at least an analysis of the first information. The computer program logic further comprises second program logic for enabling the processor-based system to synthesize second information regarding the subsets to provide the synthesized alert based on at least the subsets having the relationship. The computer program logic further comprises third program logic for enabling the processor-based system to cause the digital personal assistant to present the synthesized alert to a user.

IV. Example Computer System

FIG. 8 depicts an example computer 800 in which embodiments may be implemented. For instance, any one or more of user devices 102A-102M and/or any one or more of servers 106A-106N shown in FIG. 1, computing system 300 shown in FIG. 3, computing system 500 shown in FIG. 5, and/or computing system 700 shown in FIG. 7 may be implemented using computer 800, including one or more features of computer 800 and/or alternative features. Computer 800 may be a general-purpose computing device in the form of a conventional personal computer, a mobile computer, or a workstation, for example, or computer 800 may be a special purpose computing device. The description of computer 800 provided herein is provided for purposes of illustration, and is not intended to be limiting. Embodiments may be implemented in further types of computer systems, as would be known to persons skilled in the relevant art(s).

As shown in FIG. 8, computer 800 includes a processing unit 802, a system memory 804, and a bus 806 that couples various system components including system memory 804 to processing unit 802. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computer 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, computer program logic for implementing any one or more of digital personal assistants 108A-108M, synthesized alert logic 110, synthesized alert logic 302, analysis logic 304, determination logic 306, synthesis logic 308, causation logic 310, synthesized alert logic 502, filter logic 504, determination logic 506, synthesis logic 508, causation logic 510, synthesized alert logic 702, determination logic 706, synthesis logic 708, causation logic 710, inference logic 734, flowchart 200 (including any step of flowchart 200), flowchart 400 (including any step of flowchart 400), and/or flowchart 600 (including any step of flowchart 600), as described herein.

A user may enter commands and information into the computer 800 through input devices such as keyboard 838 and pointing device 840. Other input devices (not shown) may include a microphone, joystick, game pad, satellite dish, scanner, touch screen, camera, accelerometer, gyroscope, or the like. These and other input devices are often connected to the processing unit 802 through a serial port interface 842 that is coupled to bus 806, but may be connected by other interfaces, such as a parallel port, game port, or a universal serial bus (USB).

A display device 844 (e.g., a monitor) is also connected to bus 806 via an interface, such as a video adapter 846. In addition to display device 844, computer 800 may include other peripheral output devices (not shown) such as speakers and printers.

Computer 800 is connected to a network 848 (e.g., the Internet) through a network interface or adapter 850, a modem 852, or other means for establishing communications over the network. Modem 852, which may be internal or external, is connected to bus 806 via serial port interface 842.

As used herein, the terms "computer program medium" and "computer-readable storage medium" are used to generally refer to media (e.g., non-transitory media) such as the hard disk associated with hard disk drive 814, removable magnetic disk 818, removable optical disk 822, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850 or serial port interface 842. Such computer programs, when executed or loaded by an application, enable computer 800 to implement features of embodiments discussed herein. Accordingly, such computer programs represent controllers of the computer 800.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technology is not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
   memory; and
   one or more processors coupled to the memory and configured to:
      infer a relationship between subsets of first information that are referenced in respective alerts based on at least an analysis of the first information with regard to historical information that is learned from one or more relationships that have occurred in the past;
      transform second information regarding the subsets of the first information that are referenced in the respective alerts into a synthesized alert, which summarizes at least one of (a) the first information that is included in the subsets that are referenced in the respective alerts or (b) an issue that typically results from occurrences that are indicated by the first information that is included in the subsets that are referenced in the respective alerts, based on at least the subsets having the relationship; and
      cause a digital personal assistant to present the synthesized alert to a user.

2. The system of claim 1, wherein the synthesized alert is not requested by the user.

3. The system of claim 1, wherein the one or more processors are configured to cause the digital personal assistant to present the synthesized alert to the user based on at least a context of the user.

4. The system of claim 1, wherein the one or more processors are configured to:
   determine whether the user is to participate in a scheduled event;
   infer whether the subsets of the first information pertain to the scheduled event; and
   cause the digital personal assistant to present the synthesized alert to the user based on at least a determination that the user is to participate in the scheduled event and further based on at least an inference that the subsets of the first information pertain to the scheduled event.

5. The system of claim 4, wherein the one or more processors are configured to cause the digital personal assistant to present the synthesized alert to the user based on at least the scheduled event being scheduled to occur within a threshold duration of time from a current time.

6. The system of claim 1, wherein the first information comprises:
a first subset referenced in a first enterprise alert associated with a first time instance, the first enterprise alert indicating that an issue occurs in a system that is included in an enterprise; and
a second subset referenced in a second enterprise alert associated with a second time instance that occurs after the first time instance, the second enterprise alert indicating that the issue is resolved; and
wherein the one or more processors are configured to synthesize the first enterprise alert and the second enterprise alert to provide the synthesized alert that indicates that the system is not encountering the issue.

7. The system of claim 1, wherein the one or more processors are configured to:
determine whether the subsets of the first information are received at a rate that is greater than a threshold rate; and
cause the digital personal assistant to present the synthesized alert to the user in response to a determination that the subsets of the first information are received at the rate that is greater than the threshold rate.

8. The system of claim 1, wherein the one or more processors are configured to:
determine whether a specified user is available to perform an operation to address an issue that is associated with the first information; and
cause the digital personal assistant to present the synthesized alert to the user based on at least a determination that the specified user is not available to perform the operation to address the issue that is associated with the first information.

9. The system of claim 1, wherein the one or more processors are configured to:
determine whether the subsets of the first information are relevant to a scheduled event of the user; and
cause the digital personal assistant to present the synthesized alert to the user based on at least a determination that the subsets of the first information are relevant to the scheduled event of the user and further based on at least the scheduled event of the user being scheduled to occur within a threshold duration of time from a current time.

10. The system of claim 1, wherein the one or more processors are configured to cause the digital personal assistant to suggest an operation for the user to perform in response to the synthesized alert.

11. The system of claim 1, wherein the one or more processors are configured to:
cause the digital personal assistant to perform an operation on behalf of the user, the operation pertaining to at least one of the subsets of the first information; and
cause the digital personal assistant to notify the user that the operation has been performed.

12. The system of claim 1, wherein the one or more processors are configured to:
determine whether a role of the user is to perform an operation to address an issue that is associated with the first information; and
cause the digital personal assistant to present the synthesized alert to the user based on at least a determination that the role of the user is to perform the operation to address the issue that is associated with the first information.

13. A method comprising:
inferring a relationship between subsets of first information that are referenced in respective alerts based on at least an analysis of the first information with regard to historical information that is learned from one or more relationships that have occurred in the past;
transforming second information regarding the subsets of the first information that are referenced in the respective alerts into a synthesized alert, which summarizes at least one of (a) the first information that is included in the subsets that are referenced in the respective alerts or (b) an issue that typically results from occurrences that are indicated by the first information that is included in the subsets that are referenced in the respective alerts, based on at least the subsets having the relationship; and
causing a digital personal assistant to present the synthesized alert to a user.

14. The method of claim 13, wherein transforming the second information comprises:
transforming the second information into the synthesized alert that is not requested by the user based on at least the subsets having the relationship.

15. The method of claim 13, wherein causing the digital personal assistant to present the synthesized alert comprises:
causing the digital personal assistant to present the synthesized alert to the user based on at least a context of the user.

16. The method of claim 13, further comprising:
determining that the user is to participate in a scheduled event;
wherein inferring the relationship comprises:
inferring that the subsets of the first information pertain to the scheduled event; and
wherein causing the digital personal assistant to present the synthesized alert comprises:
causing the digital personal assistant to present the synthesized alert to the user based on at least a determination that the user is to participate in the scheduled event and further based on at least an inference that the subsets of the first information pertain to the scheduled event.

17. The method of claim 16, wherein causing the digital personal assistant to present the synthesized alert comprises:
causing the digital personal assistant to present the synthesized alert to the user based on at least the scheduled event being scheduled to occur within a threshold duration of time from a current time.

18. The method of claim 13, further comprising:
receiving a first enterprise alert associated with a first time instance, the first enterprise alert indicating that an issue occurs in a system that is included in an enterprise; and
receiving a second enterprise alert associated with a second time instance that occurs after the first time instance, the second enterprise alert indicating that the issue is resolved;
wherein transforming the second information comprises:
synthesizing the first enterprise alert and the second enterprise alert to provide the synthesized alert that indicates that the system is not encountering the issue.

19. The method of claim 13, further comprising:
determining that the subsets of the first information are received at a rate that is greater than a threshold rate;
wherein causing the digital personal assistant to present the synthesized alert comprises:

causing the digital personal assistant to present the synthesized alert to the user in response to determining that the subsets of the first information are received at the rate that is greater than the threshold rate.

20. A computer program product comprising a computer-readable storage medium having computer program logic recorded thereon for enabling a processor-based system to present a synthesized alert using a digital personal assistant, the computer program logic comprising:

means for enabling the processor-based system to infer a relationship between subsets of first information that are referenced in respective alerts based on at least an analysis of the first information with regard to historical information that is learned from one or more relationships that have occurred in the past;

means for enabling the processor-based system to transform second information regarding the subsets of the first information that are referenced in the respective alerts into the synthesized alert, which summarizes at least one of (a) the first information that is included in the subsets that are referenced in the respective alerts or (b) an issue that typically results from occurrences that are indicated by the first information that is included in the subsets that are referenced in the respective alerts, based on at least the subsets having the relationship; and means for enabling the processor-based system to cause the digital personal assistant to present the synthesized alert to a user.

* * * * *